(12) United States Patent
Murata et al.

(10) Patent No.: US 12,073,175 B2
(45) Date of Patent: Aug. 27, 2024

(54) SERVER SYSTEM, COMMUNICATION SYSTEM, AND METHOD OF INTERMEDIATING COMMUNICATION

(71) Applicants: Jun Murata, Tokyo (JP); Xiaonan Jiang, Kanagawa (JP); Katsuyuki Kaji, Tokyo (JP)

(72) Inventors: Jun Murata, Tokyo (JP); Xiaonan Jiang, Kanagawa (JP); Katsuyuki Kaji, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/694,691

(22) Filed: Mar. 15, 2022

(65) Prior Publication Data
US 2022/0309237 A1    Sep. 29, 2022

(30) Foreign Application Priority Data

Mar. 23, 2021   (JP) .................................. 2021-048505
Dec. 28, 2021   (JP) .................................. 2021-214833

(51) Int. Cl.
G06F 3/048        (2013.01)
G06F 3/0484       (2022.01)
G06F 40/174       (2020.01)

(52) U.S. Cl.
CPC .......... G06F 40/174 (2020.01); G06F 3/0484 (2013.01)

(58) Field of Classification Search
None
See application file for complete search history.

(56) References Cited

U.S. PATENT DOCUMENTS

| | | | |
|---|---|---|---|
| 6,385,594 B1* | 5/2002 | Lebda | G06F 40/174 705/38 |
| 6,985,886 B1* | 1/2006 | Broadbent | G06Q 40/03 705/64 |
| 8,666,786 B1* | 3/2014 | Wirz | G06Q 40/08 705/30 |
| 11,138,657 B1* | 10/2021 | Boeder | G06Q 40/03 |
| 2003/0056171 A1* | 3/2003 | Yone | G06F 40/174 715/224 |
| 2003/0083903 A1* | 5/2003 | Myers | G16H 15/00 705/2 |
| 2004/0205019 A1* | 10/2004 | Painter | G06Q 40/02 705/38 |
| 2005/0080649 A1* | 4/2005 | Alvarez | G06Q 40/08 705/322 |
| 2005/0262429 A1* | 11/2005 | Elder | G06F 40/171 715/268 |
| 2006/0100944 A1* | 5/2006 | Reddin | G06Q 40/02 707/999.1 |

(Continued)

FOREIGN PATENT DOCUMENTS

JP    2021-033762    3/2021

*Primary Examiner* — Hua Lu
(74) *Attorney, Agent, or Firm* — XSENSUS LLP

(57) ABSTRACT

An apparatus, system, and method, each of which: stores in a memory information relating to a plurality of forms each issued by a first user; receives, from a first terminal of the first user, a request for applying a service based on a particular form of the plurality of forms, and an identifier of the particular form; and transmits a request for applying the service and the identifier of the particular form to a second terminal.

20 Claims, 36 Drawing Sheets

(56) References Cited

U.S. PATENT DOCUMENTS

| | | | | |
|---|---|---|---|---|
| 2007/0192140 | A1* | 8/2007 | Gropper | G06F 21/6245 715/205 |
| 2007/0282744 | A1* | 12/2007 | Barnes | G06Q 40/02 705/40 |
| 2010/0174620 | A1* | 7/2010 | Stringfellow | G06Q 20/227 705/26.1 |
| 2010/0211484 | A1* | 8/2010 | Malcolm | G06Q 50/18 707/E17.014 |
| 2010/0313111 | A1* | 12/2010 | Ozonat | G06Q 30/06 715/222 |
| 2011/0184776 | A1* | 7/2011 | Spradling | G06Q 10/10 705/7.28 |
| 2011/0258122 | A1* | 10/2011 | Shader | G06Q 20/14 705/67 |
| 2011/0313884 | A1* | 12/2011 | Eze | G06Q 40/02 705/26.41 |
| 2012/0185275 | A1* | 7/2012 | Loghmani | G06Q 40/08 705/3 |
| 2013/0054678 | A1* | 2/2013 | Williams | G16H 10/60 709/203 |
| 2014/0052466 | A1* | 2/2014 | DeVille | G16H 10/60 705/2 |
| 2018/0129641 | A1* | 5/2018 | Elliott | G06K 7/1413 |
| 2018/0218418 | A1* | 8/2018 | Yuasa | G06Q 30/0605 |
| 2020/0220926 | A1* | 7/2020 | Herbert | G06F 8/41 |
| 2020/0234380 | A1* | 7/2020 | Dulori | G06Q 30/0283 |
| 2021/0326960 | A1* | 10/2021 | Nosrati | G06N 5/04 |
| 2021/0374479 | A1* | 12/2021 | Zambetti, Jr. | G06F 18/217 |
| 2021/0390534 | A1* | 12/2021 | Ashcroft | G06Q 20/382 |
| 2022/0351112 | A1* | 11/2022 | Mochty | G06Q 10/0635 |

\* cited by examiner

FIG. 5

| TENANT ID | COMPANY NAME | TRADE NAME | ADDRESS | INDUSTRY TYPE | USE START DATE | BANK ACCOUNT 1 | BANK ACCOUNT 2 | COORDINATION SERVICE |
|---|---|---|---|---|---|---|---|---|
| User1001 | CORPORATION A1 | - | KANAGAWA... | CONSTRUCTION | 2019/04/01 | AAA BANK aa BRANCH SAVINGS 1111111 | CCC BANK cc BRANCH SAVINGS 3333333 | https://... |
| User2001 | A2 GENERAL HOSPITAL | - | OSAKA... | HEALTH CARE | 2018/10/01 | BBB BANK bb BRANCH SAVINGS 2222222 | - | https://... |
| User3001 | - | A3 STORE | TOKYO... | RETAIL | 2020/04/01 | DDD BANK dd BRANCH SAVINGS 4444444 | - | - |
| ... | ... | ... | ... | ... | ... | ... | ... | ... |

FIG. 6

TENANT ID: User1001 (CORPORATION A1)

| BILL PAYER ID | BILL PAYER | USER NAME | ADDRESS | TELEPHONE NUMBER | EMAIL ADDRESS | PERSON IN CHARGE | ACCOUNT NUMBER |
|---|---|---|---|---|---|---|---|
| X0001 | CORPORATION B1 | - | TOKYO... | 03-XXXX-XXXX | XX@XX.XX | b1Taro | ... |
| X0002 | B2 CORPORATION | - | OSAKA... | 06-ZZZZ-ZZZZ | ZZ@ZZ.ZZ | BHanako | ... |
| X0003 | - | B3 | FUKUOKA... | 090-YYYY-YYYY | YY@YY.YY | CJiro | ... |
| ... | ... | ... | ... | ... | ... | ... | ... |

FIG. 7

TENANT ID: User1001 (CORPORATION A1)

| INVOICE NUMBER (FORM ID) | BILL PAYER ID | BILL PAYER | BILLING AMOUNT | PAYMENT DUE | INVOICE IMAGE | DATE SENT | PAYMENT STATUS | PAYMENT DATE | PAYMENT ACCOUNT |
|---|---|---|---|---|---|---|---|---|---|
| ... | ... | ... | ... | ... | ... | ... | ... | ... | ... |
| 1006 | X0001 | CORPORATION B1 | 100,000 | 20180430 | file://aaa/1006.pdf | 20180322 | PAID | 20180425 | ... |
| 1007 | X0002 | B2 CORPORATION | 200,000 | 20180430 | file://aaa/1007.pdf | 20180322 | PAID | 20180425 | ... |
| 1008 | X0001 | CORPORATION B1 | 300,000 | 20180531 | file://aaa/1008.pdf | 20180323 | PAID | 20180425 | ... |
| ... | ... | ... | ... | ... | ... | ... | ... | ... | ... |
| 1054 | X0002 | B2 CORPORATION | 200,000 | 20201130 | file://aaa/1054.pdf | 20201022 | NOT COLLECTED | | |
| 1055 | X0003 | B3 | 500,000 | 20201230 | file://aaa/1055.pdf | 20201022 | NOT COLLECTED | | |
| 1056 | X0001 | CORPORATION B1 | 880,000 | 20201130 | file://aaa/1056.pdf | – | NOT COLLECTED | | |
| ... | ... | ... | ... | ... | ... | ... | ... | ... | ... |

FIG. 8

| TYPE | SERVICE NAME (COMPANY NAME) | INDUSTRY OF SPECIALTY | NON-APPLICABLE INDUSTRY | COVERAGE AREA | PRIVATE BUSINESS | AMOUNT LIMIT | DATE OF PAYMENT | USER NAME | PASS-WORD | EMAIL ADDRESS | PERSON IN CHARGE | AD |
|---|---|---|---|---|---|---|---|---|---|---|---|---|
| AC-COUNTS RECEIV-ABLE | SERVICE E1 | ALL | NONE | ALL | TRUE | NO LIMIT | WITHIN 3 DAYS | User9011 | ******** | XX@XX.XX | E1Taro | SPECIALIZED IN CONSTRUCTION INDUSTRY |
| | SERVICE E2 | CONSTRUC-TION, TRANS-PORTATION | HEALTH CARE, NURSING | ALL | TRUE | 1 billion | WITHIN 3 DAYS | User9021 | ******** | XX@XX.XX | E2Taro | NONE |
| ... | ... | ... | ... | ... | ... | ... | ... | ... | ... | ... | ... | ... |
| FAC-TORING | SERVICE D1 | ALL | NONE | ALL | TRUE | 10 million | 2-5 DAYS | User9031 | ******** | XX@XX.XX | D1Taro | QUICK AUDIT WITHIN DAY |
| | SERVICE D2 | HEALTH CARE, NURSING | CONSTRUC-TION | ONLY WEST JAPAN | FALSE | 5 million | WITHIN 2 DAYS | User9041 | ******** | XX@XX.XX | D2Taro | NONE |
| ... | ... | ... | ... | ... | ... | ... | ... | ... | ... | ... | ... | ... |

FIG. 9

| SERVICE NAME | PERIOD (MONTH) FOR EVIDENCE INFORMATION |
|---|---|
| SERVICE D1 | 6 |
| SERVICE D2 | 24 |
| SERVICE D3 | 12 |
| SERVICE D4 | 7 |
| SERVICE D5 | 36 |
| ... | ... |

FIG. 10

| SERVICE PROVIDER: D1 | | | |
|---|---|---|---|
| APPLICATION ID | PRELIMINARY AUDIT STATUS | MAIN AUDIT STATUS | AUDIT RESULT |
| 1011 | AUDITING | – | – |
| 1012 | OK | APPLICATION REQUESTED | SERVICE CHARGE RATE: ··· |
| | | | EXPENSES: ··· |
| | | | ... |
| 1013 | OK | WAITING | SERVICE CHARGE RATE: ··· |
| | | | EXPENSES: ··· |
| | | | ... |

FIG. 11

| APPLICA-TION ID | INVOICE NUMBER (FORM ID) | BILLER COMPANY NAME | BILLER ADDRESS | BILL PAYER COMPANY NAME | BILL PAYER ADDRESS | BILLING AMOUNT | PAYMENT DUE | ISSUE DATE | APPLICATION DATE |
|---|---|---|---|---|---|---|---|---|---|
| 1011 | 1056 | CORPORATION A1 | KANAGAWA… | CORPORATION B1 | TOKYO… | 880,000 | 20201130 | 20201022 | 20201022 |
| 1012 | 2078 | CORPORATION A9 | OSAKA… | CORPORATION B9 | HYOGO… | 1,200,000 | 20201130 | 20201015 | 20201018 |
| 1013 | 3681 | CORPORATION A8 | FUKUOKA… | CORPORATION B8 | SAGA… | 880,000 | 20201130 | 20201022 | 20201025 |
| … | … | … | … | … | … | … | … | … | … |

FIG. 12

| TENANT ID : User1001 (CORPORATION A1) | | | | | |
|---|---|---|---|---|---|
| TRANSAC-TION DATE | AMOUNT OF PAYMENT | PAYEE | DEPOSIT | DEPOSIT SOURCE | BALANCE |
| 2020325 | 500,000 | CORPORATION B3 | | | 10,000,000 |
| 2020325 | | | 500,000 | CORPORATION B5 | 10,500,000 |
| 2020326 | 1,000,000 | XX CARD | | | 9,500,000 |
| … | … | … | … | … | … |

FIG. 14

CORPORATION B1
INVOICE NUMBER 1056
TOTAL ¥880,000

TO | XX@XX.XX
EMAIL WILL BE SENT TO ADDRESS ABOVE.

☑ APPLY FUNDS AUDIT

SUBJECT | INVOICE NUMBER 1056

MESSAGE | Dear Sir/Madam:
Please access the following link to obtain the documents for funds audit.
Best regards,

☑ MAIL DOCUMENTS WILL BE SENT BY MAIL, IF ADDRESSED TO DOMESTIC ADDRESS.

SEND DOCUMENTS

FIG. 16

| | | FINANCING SOURCE SELECTION SCREEN | |
|---|---|---|---|
| | | PLEASE SELECT FINANCING SOURCE TO APPLY FUNDS AUDIT. | |
| c31 | ✔ | SERVICE D1 | QUICK AUDIT WITHIN DAY! |
| c32 | ✔ | SERVICE D2 | SPECIALIZED IN NURSING INDUSTRY! |
| c33 | ✔ | SERVICE D3 | |
| c34 | ✔ | SERVICE D4 | PAYMENT DUE AFTER 3 MONTHS |
| c35 | | SERVICE D5 | SPECIALIZED IN CONSTRUCTION INDUSTRY |

NEXT ~ b31

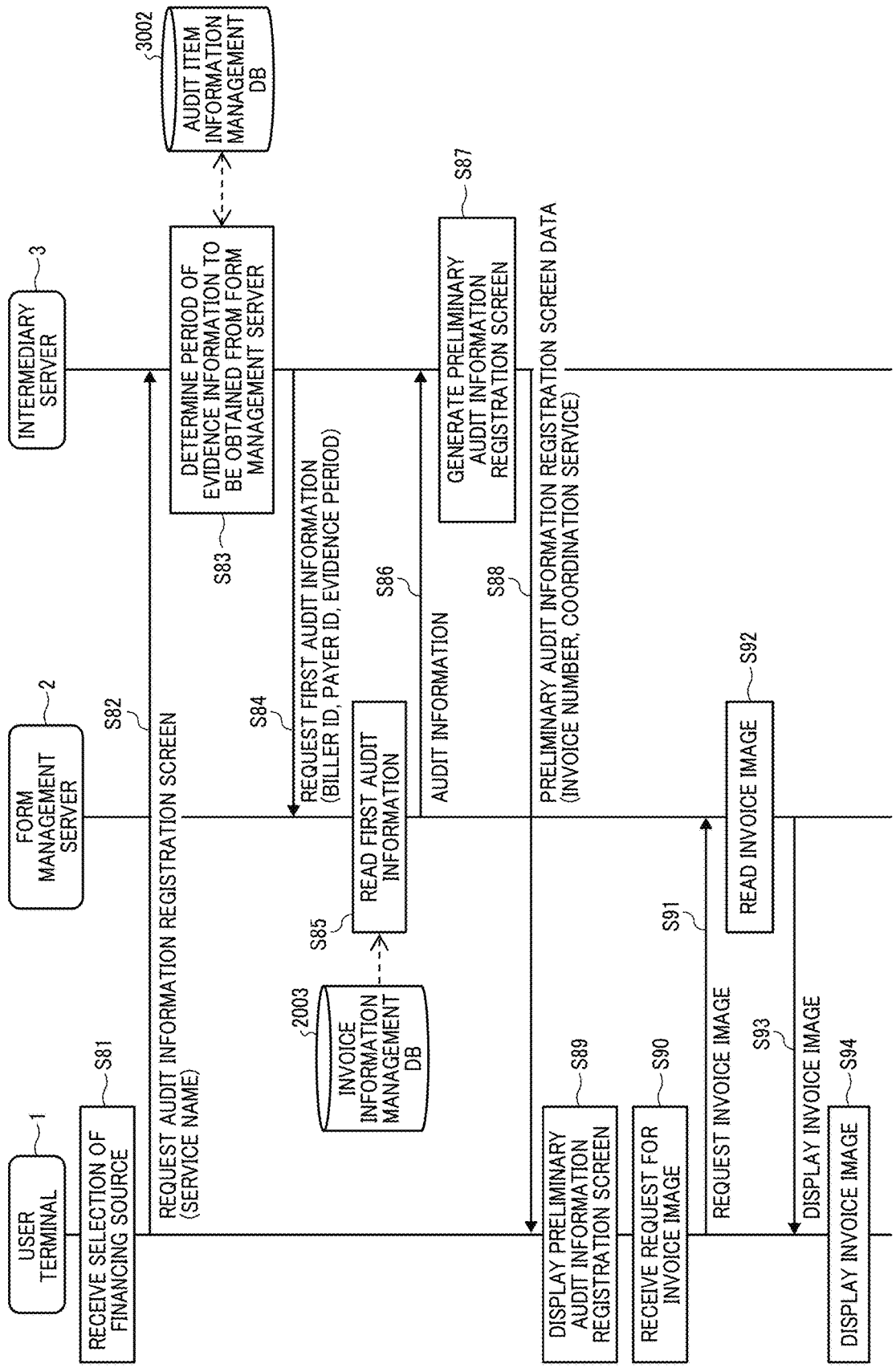

FIG. 18

PRELIMINARY AUDIT INFORMATION REGISTRATION SCREEN

PLEASE FILL OUT NECESSARY INFORMATION TO APPLY FOR PRELIMINARY AUDIT.

■ YOUR COMPANY
- CORPORATION: CORPORATION A1
- ADDRESS: KANAGAWA······

■ CUSTOMER
- COMPANY NAME: CORPORATION B1
- ADDRESS: TOKYO······

■ AUDIT DOCUMENTS f41
- INVOICE IMAGE [INVOICE NUMBER 1056  TOTAL ¥880,000]  CHECK — b41
- FINANCIAL STATEMENT  REGISTER FILE — b42
- CONTRACT  REGISTER FILE — b43

■ EVIDENCE
AUTOMATIC TRANSMISSION OF TRANSACTION HISTORY
r41 ⦿ YES   r42 ○ NO

SETTING AREA a41

BACK — b48    APPLY — b49

FIG. 19

INVOICE CHECK SCREEN

INVOICE IMAGE X1

CORPORATION B1

XXX-XXXX
TOKYO······

ISSUE DATE    October 22, 2020
PAYMENT DUE   November 30, 2020
INVOICE NUMBER 1056

CORPORATION A1

[Stamp: CORPORATION A1]

ORDER IN OCTOBER

| DETAIL | TAX RATE | UNIT PRICE | QUANTITY | TAX | COST |
|---|---|---|---|---|---|
| SAMPLE A | 10% | ¥20,000 | 10 | ☆ | ¥200,000 |
| SAMPLE B | 10% | ¥60,000 | 5 | ☆ | ¥300,000 |
| SAMPLE C | 10% | ¥15,000 | 20 | ☆ | ¥300,000 |
| | TAX(10%) | ¥80,000 | | SUBTOTAL | ¥800,000 |
| | | | | TOTAL | ¥880,000 |

Thank you for your order.
ACCOUNT FOR TRANSFER
AAA BANK   aa BRANCH   SAVINGS 1111111

| APPLI-CATION ID | INVOICE NUMBER (FORM ID) | BILLER COMPANY NAME | BILLER ADDRESS | BILLER EMAIL ADDRESS | BILL PAYER COMPANY NAME | BILL PAYER ADDRESS | BILLING AMOUNT | PAYMENT DUE | ISSUE DATE | APPLI-CATION DATE | TRANS-ACTION IMAGE | CONTRACT IMAGE | STATE-MENT IMAGE |
|---|---|---|---|---|---|---|---|---|---|---|---|---|---|
| 1011 | 1056 | CORPO-RATION A1 | KANAGAWA ... | xx@xx.xx | CORPO-RATION B1 | TOKYO ... | 880,000 | 20201130 | 20201022 | 20201022 | file://aaa/ 1011_1.pdf | file://aaa/ 1011_2.pdf | file://aaa/ 1011_3.pdf |
| 1012 | 2078 | CORPO-RATION A9 | OSAKA ... | xx@xx.xx | CORPO-RATION B9 | HYOGO ... | 1,200,000 | 20201130 | 20201015 | 20201018 | | file://aaa/ 1012_1.pdf | file://aaa/ 1001_2.pdf |
| 1013 | 3681 | CORPO-RATION A8 | FUKUOKA ... | xx@xx.xx | CORPO-RATION B8 | SAGA ... | 880,000 | 20201130 | 20201022 | 20201025 | | file://aaa/ 1013_1.pdf | file://aaa/ 1013_2.pdf |
| ... | ... | ... | ... | ... | ... | ... | ... | ... | ... | ... | ... | ... | ... |

FIG. 23

PRELIMINARY AUDIT INFORMATION
REGISTRATION SCREEN

PLEASE FILL OUT
NECESSARY INFORMATION
TO APPLY FOR
PRELIMINARY AUDIT.

■ YOUR COMPANY

CORPORATION [ CORPORATION A1 ]

ADDRESS [ KANAGAWA······ ]

······

■ CUSTOMER

COMPANY NAME [ CORPORATION B1 ]

ADDRESS [ TOKYO······ ]

······

■ AUDIT DOCUMENTS  f41

INVOICE IMAGE  📄 INVOICE NUMBER 1056
TOTAL ¥880,000  [CHECK] b41

FINANCIAL STATEMENT [REGISTER FILE] b42  CONTRACT [REGISTER FILE] b43

■ EVIDENCE  AUTOMATIC TRANSMISSION OF TRANSACTION HISTORY  ⦿ YES r41    ○ NO r42

PLEASE SELECT SUBMISSION METHOD OF TRANSACTIONS

⦿ AUTOMATIC TRANSMISSION OF TRANSACTIONS  r43
○ MANUAL TRANSMISSION OF TRANSACTIONS  r44    [REGISTER FILE] b44

SETTING AREA a41

[BACK] b48    [APPLY] b49

FIG. 24

PRELIMINARY AUDIT INFORMATION
REGISTRATION SCREEN

PLEASE FILL OUT
NECESSARY INFORMATION
TO APPLY FOR
PRELIMINARY AUDIT.

■YOUR COMPANY
 CORPORATION [CORPORATION A1]
 ADDRESS [KANAGAWA……]
 ……

■CUSTOMER
 COMPANY NAME [CORPORATION B1]
 ADDRESS [TOKYO……]
 ……

■AUDIT DOCUMENTS f41
 INVOICE IMAGE [INVOICE NUMBER 1056 / TOTAL ¥880,000] — CHECK b41
 FINANCIAL STATEMENT [REGISTER FILE] — b42
 CONTRACT [REGISTER FILE] — b43

■EVIDENCE
 AUTOMATIC TRANSMISSION OF TRANSACTION HISTORY  ●YES r41   ○NO r42
 MANUAL TRANSMISSION OF TRANSACTIONS [REGISTER FILE] — b44

SETTING AREA a41

[BACK] b48    [APPLY] b49

FIG. 26

PRELIMINARY AUDIT INFORMATION
REGISTRATION SCREEN

PLEASE FILL OUT NECESSARY INFORMATION TO APPLY FOR PRELIMINARY AUDIT.

■YOUR COMPANY
CORPORATION [CORPORATION A1]
ADDRESS [KANAGAWA······]
······

■CUSTOMER
COMPANY NAME [CORPORATION B1]
ADDRESS [TOKYO······]
······

■AUDIT DOCUMENTS f41
INVOICE IMAGE — INVOICE NUMBER 1056
TOTAL ¥880,000
CHECK b41

FINANCIAL STATEMENT [REGISTER FILE] b42    CONTRACT [REGISTER FILE] b43

■EVIDENCE    AUTOMATIC TRANSMISSION OF TRANSACTION HISTORY ○YES r41    ●NO r42
PLEASE SELECT SUBMISSION METHOD OF TRANSACTIONS
●AUTOMATIC TRANSMISSION OF TRANSACTIONS r43    ○MANUAL TRANSMISSION OF TRANSACTIONS r44

[REGISTER FILE] b44

SETTING AREA a41

[BACK] b48    [APPLY] b49

FIG. 27

PRELIMINARY AUDIT INFORMATION REGISTRATION SCREEN

PLEASE FILL OUT NECESSARY INFORMATION TO APPLY FOR PRELIMINARY AUDIT.

■ YOUR COMPANY
- CORPORATION: CORPORATION A1
- ADDRESS: KANAGAWA......

■ CUSTOMER
- COMPANY NAME: CORPORATION B1
- ADDRESS: TOKYO......

■ AUDIT DOCUMENTS

INVOICE IMAGE — f41
- INVOICE NUMBER 1056
- TOTAL ¥880,000
- CHECK — b41

FINANCIAL STATEMENT [REGISTER FILE] — b42
CONTRACT [REGISTER FILE] — b43

■ EVIDENCE
- AUTOMATIC TRANSMISSION OF TRANSACTION HISTORY ○ YES — r41
- ● NO — r42
- MANUAL TRANSMISSION OF TRANSACTIONS [REGISTER FILE] — b44

SETTING AREA a41

[BACK] — b48   [APPLY] — b49

FIG. 32

TRANSACTION INFORMATION t71 — AAA BANK  aa BRANCH  SAVINGS 1111111 t72 — CCC BANK  cc BRANCH  SAVINGS 4444444

| TRANSACTION DATE | PAYMENT AMOUNT | DEPOSIT | BALANCE |
|---|---|---|---|
| 20200325 | 500,000<br>CORPORATION B3 | | 10,000,000 |
| 20200325 | | 500,000<br>CORPORATION B5 | 10,500,000 |
| 20200326 | 1,000,000<br>XX CARD | | 9,500,000 |

ACCOUNT BOOK IMAGE — b76

PRINT — b77

TRANSACTION HISTORY

| INVOICE NUMBER | BILL PAYER | BILLING AMOUNT | PAYMENT DUE | TRANSFER DATE | TRANSFER STATUS | PAYMENT DATE | PAYMENT ACCOUNT a81 |
|---|---|---|---|---|---|---|---|
| ⋮ | ⋮ | ⋮ | ⋮ | ⋮ | ⋮ | ⋮ | ⋮ |
| 1006 | CORPORATION B1 | 100,000 | 20180430 | 20180322 | TRANSFERRED | 20180425 | ⋮ |
| 1008 | CORPORATION B1 | 300,000 | 20180531 | 20180323 | TRANSFERRED | 20180525 | ⋮ |
| ⋮ | ⋮ | ⋮ | ⋮ | ⋮ | ⋮ | ⋮ | ⋮ |

PRINT ~b87    OK ~b88

FIG. 34

TRANSACTION DETAIL

TRANSACTION START — YEAR 2018 — MONTH April

TRANSACTION AMOUNT — AVERAGE 500,000 YEN — MAXIMUM 1,000,000

TOTAL 25

DELAYED 0 a91

CONTRACT CHECK — b96

STATEMENT CHECK — b97

PRELIMINARY AUDIT RESULT REGISTRATION

BILLER COMPANY NAME     CORPORATION A1

BILL PAYER COMPANY NAME     CORPORATION B1 r101 — ◉ PRELIMINARY AUDIT APPROVED     r102 — ○ PRELIMINARY AUDIT REJECTED     a104

| | | | | | |
|---|---|---|---|---|---|
| BILLING AMOUNT | 880,000 YEN | | | | |
| SERVICE CHARGE | 10 | % | | | |
| EXPENSES | 50,000 | YEAR | | | |
| TRANSFER AMOUNT | 742,000 | YEAR | | | 88,000 YEN |
| PLANNED TRANSFER DATE | October | 25 | , | 2020 | |
| PAYMENT DUE | November | 30 | , | 2020 | |

REGISTER — b108

CANCEL — b109

FIG. 38

FUNDS APPLICATION LIST a121

| PAYER | BILLING AMOUNT | PRELIMINARY AUDIT STATUS | | | |
|---|---|---|---|---|---|
| | | SERVICE COMPANY D1 | SERVICE COMPANY D2 | ... | |
| CORPORATION B1 | 880,000 | OK | OK | ... | PRELIMINARY AUDIT RESULT LIST — b122a |
| CORPORATION B2 | 1,000,000 | AUDITING | NG | ... | PRELIMINARY AUDIT RESULT LIST — b122b |

FIG. 39

PRELIMINARY AUDIT RESULT LIST

PAYER: CORPORATION B1
BILLING AMOUNT: 880,000
INVOICE NUMBER: 1056

| | AUDIT STATUS | FINANCING TYPE | FINANCING SOURCE | SERVICE CHARGE RATE | EXPENSES | TRANSFER AMOUNT | PAYMENT DATE | PAYMENT DUE |
|---|---|---|---|---|---|---|---|---|
| r132a ⦿ | OK | FACTORING | CORPORATION D1 | 10% | 50,000 | 742,000 | 2020/10/25 | 2020/11/30 |
| r132b ○ | OK | FACTORING | CORPORATION D2 | 15% | 48,000 | 700,000 | 2020/11/01 | 2020/12/31 |
| | NO RESPONSE | FACTORING | CORPORATION D3 | | | | | |
| | NG | FACTORING | CORPORATION D4 | | | | | | a131

[REQUEST MAIN AUDIT] b138

SERVER SYSTEM, COMMUNICATION SYSTEM, AND METHOD OF INTERMEDIATING COMMUNICATION

CROSS-REFERENCE TO RELATED APPLICATIONS

This patent application is based on and claims priority pursuant to 35 U.S.C. § 119(a) to Japanese Patent Application Nos. 2021-048505, filed on Mar. 23, 2021, and 2021-214833, filed on Dec. 28, 2021, in the Japan Patent Office, the entire disclosure of which is hereby incorporated by reference herein.

BACKGROUND

Technical Field

The present disclosure relates to a server system, a communication system, and a method of intermediating communication.

Related Art

For example, there is a computer system for assisting a user to apply for a service to a service provider. However, the user who applies for a service is often required to input information to apply for the service, thus requiring time and work for the user.

SUMMARY

Example embodiments include a server system including: a memory that stores information relating to a plurality of forms each issued by a first user; and circuitry that receives, from a first terminal of the first user, a request for applying a service based on a particular form of the plurality of forms, and an identifier of the particular form, and transmits a request for applying the service and the identifier of the particular form to a second terminal.

Example embodiments include a server apparatus including: a network interface that communicates with another server apparatus that generates a plurality of forms each issued by a first user; and circuitry that receives, from the another server, a request for applying a service based on a particular form of the plurality of forms, and an identifier of the particular form, and transmits a request for applying the service and the identifier of the particular form to a second terminal.

Example embodiments include a method of intermediating communication, including: storing in a memory information relating to a plurality of forms each issued by a first user; receiving, from a first terminal of the first user, a request for applying a service based on a particular form of the plurality of forms, and an identifier of the particular form; and transmitting a request for applying the service and the identifier of the particular form to a second terminal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a conceptual diagram illustrating an example of tenant information management table;

FIG. 6 is a conceptual diagram of a payer information management table;

FIG. 7 is a conceptual diagram illustrating an example of invoice information management table;

FIG. 8 is a conceptual diagram illustrating an example of financing source management table;

FIG. 9 is a conceptual diagram illustrating an example of audit item information management table;

FIG. 10 is a conceptual diagram illustrating an example of audit management table:

FIG. 11 is a conceptual diagram illustrating an example of application information management table;

FIG. 12 is a conceptual diagram illustrating an example of account transaction management table;

FIG. 14 is an illustration of example invoice transmission screen;

FIG. 16 is an illustration of an example of financing source selection screen;

FIG. 17 is a sequence diagram illustrating processing of registering preliminary audit information, according to the embodiment;

FIG. 18 is an illustration of an example of preliminary audit information registration screen;

FIG. 19 is a sequence diagram illustrating processing of intermediating application for preliminary audit, according to the embodiment;

FIG. 21 is a conceptual diagram illustrating an example of application information management table, according to a modified example;

FIG. 23 is an illustration of an example of preliminary audit information registration screen displayed in a second initial display mode;

FIG. 24 is an illustration of an example of preliminary audit information registration screen displayed in a third initial display mode;

FIG. 26 is an illustration of an example of preliminary audit information registration screen displayed in a display mode, such that a submission method is selectable ("selectable submission display mode").

FIG. 27 is an illustration of an example of preliminary audit information registration screen displayed, while manual transmission is being selected ("manual submission display mode").

FIG. 32 is an illustration of a transaction information screen;

FIG. 33 is an illustration of an example transaction history screen;

FIG. 34 is an illustration of an example transaction detail screen;

FIG. 35 is an illustration of an example preliminary audit result screen;

FIG. 38 is an illustration of an example of funds application list screen; and

FIG. 39 is an illustration of an example of preliminary audit result list screen.

Figure 1:
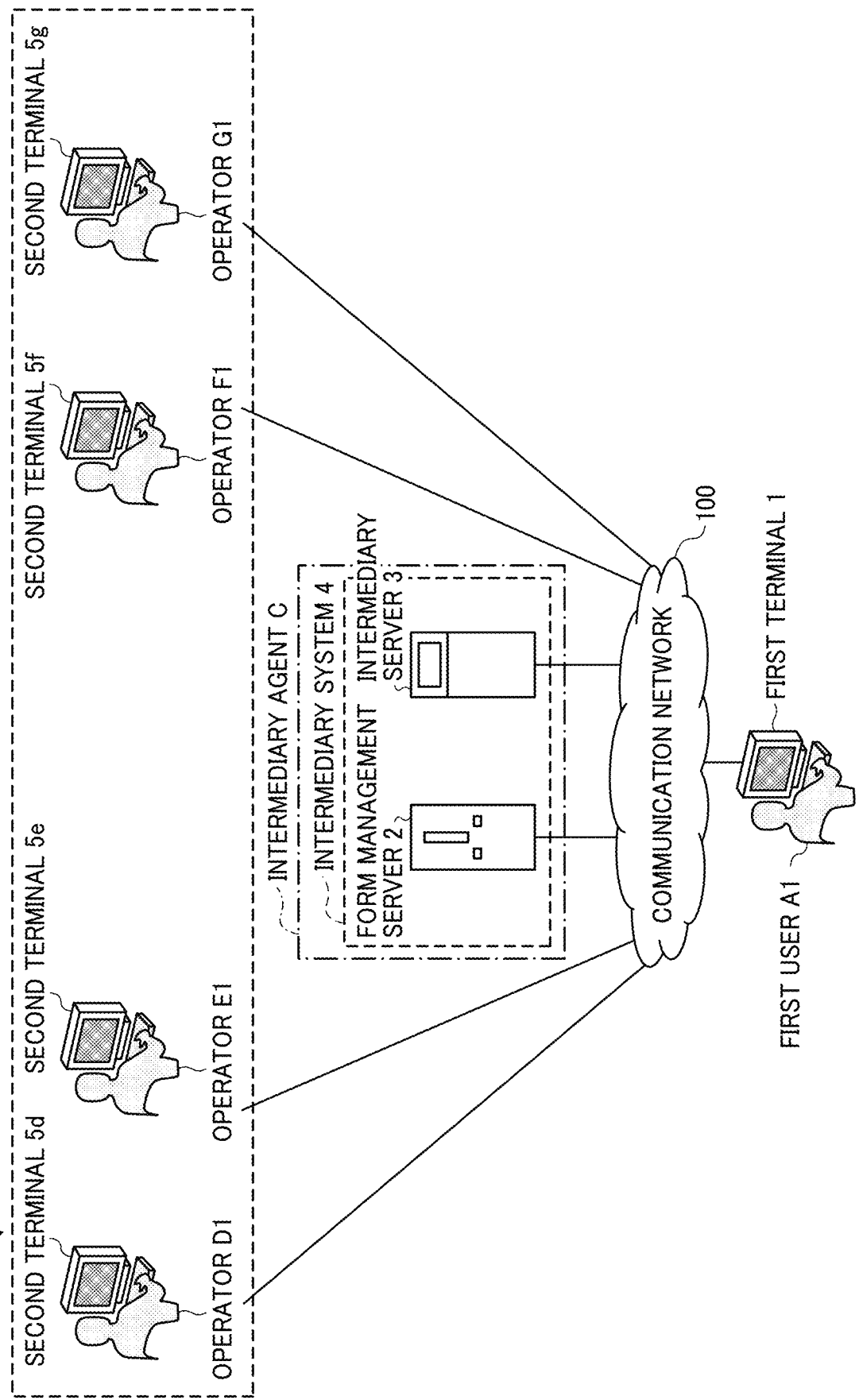
FIG. 1 is a schematic diagram illustrating a configuration of a communication system according to the embodiments.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Overview of Communication System

Figure 3:
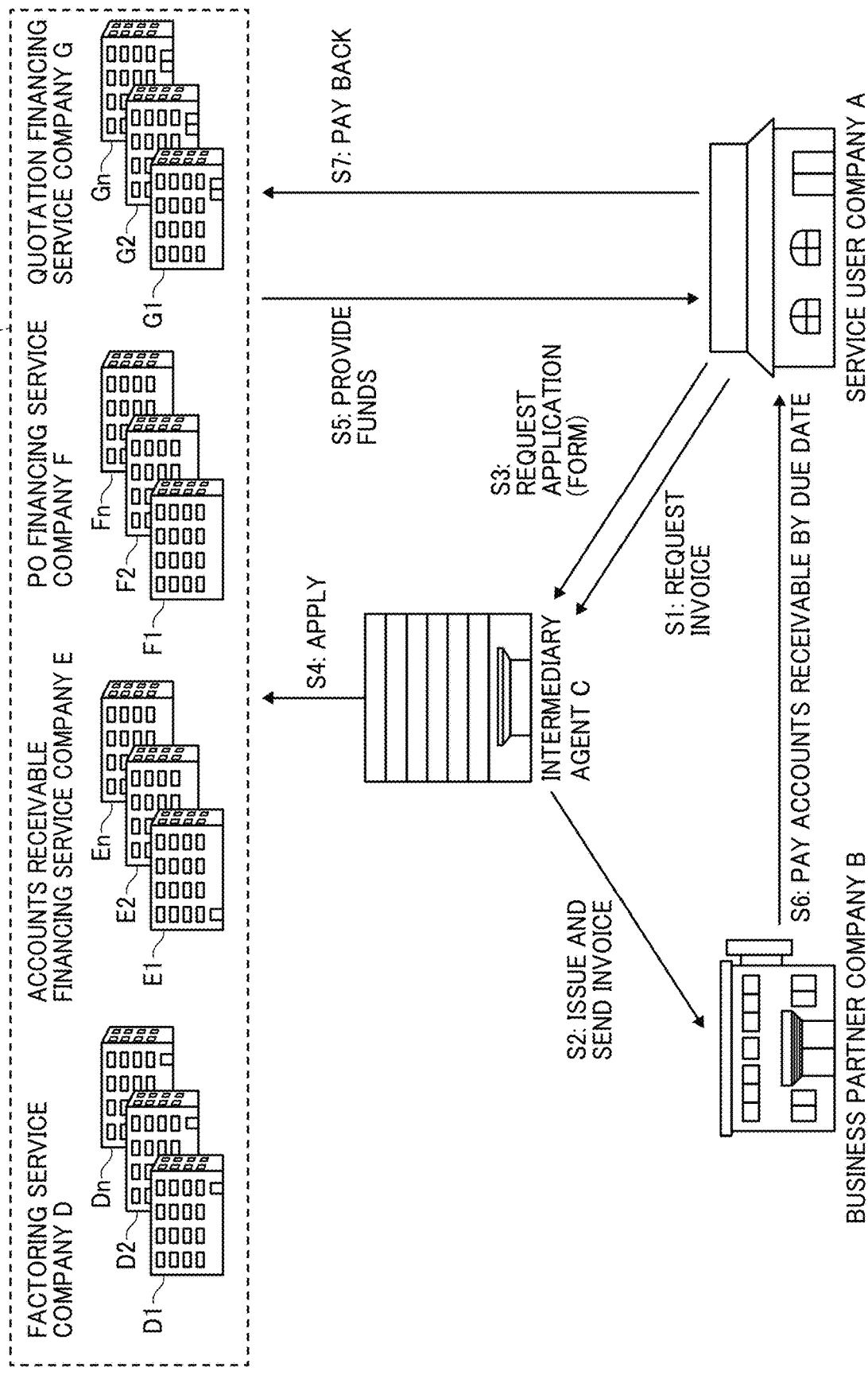
FIG. 3 is a diagram illustrating relationships between companies, as entities implementing the communication system, according to the embodiments.

FIG. 1 is a schematic diagram illustrating a configuration of a communication system according to the embodiments. Specifically, FIG. 1 is a diagram illustrating a terminal or a server provided at each entity, for example, at each company as illustrated in FIG. 3.

The communication system of FIG. 1 includes a first terminal 1 operated by a first user A1, and a plurality of second terminals 5d, 5e, 5f, and 5g respectively operated by a plurality of operators D1, E1, F1, and G1. The communication system of FIG. 1 further includes an intermediary system 4 including a form management server 2 and an intermediary server 3, operated by an intermediary agent C.

In one embodiment, the intermediary system 4 receives, from the first terminal 1, a request for transmitting a particular form, issued by the first user A1, to a transmission destination of the particular form, with an identifier of the particular form. With such request for transmitting the particular form, the first terminal 1 may send a request for applying a service based on the particular form. In response to the request for applying the service based on the particular form, which is transmitted with the identifier of the particular form, the intermediary system 4 sends a request for applying the service to at least one of the second terminals 5d to 5g operated by an operator of the service provider. Further, with the request for applying, the identifier of the particular form is also transmitted, such that various information stored in association with the identifier of the particular form may be used, if there is information that is suitable to the application.

Hardware Configuration of Communication System

Next, referring to FIG. 2, hardware configurations of terminal and servers in the communication system illustrated in FIG. 1 will be described according to the embodiment. Since all of the terminal and the servers have the same hardware configuration, the hardware configuration of the first terminal 1 will be described as an example, and the description of the hardware configuration of each server is omitted.

Figure 2:
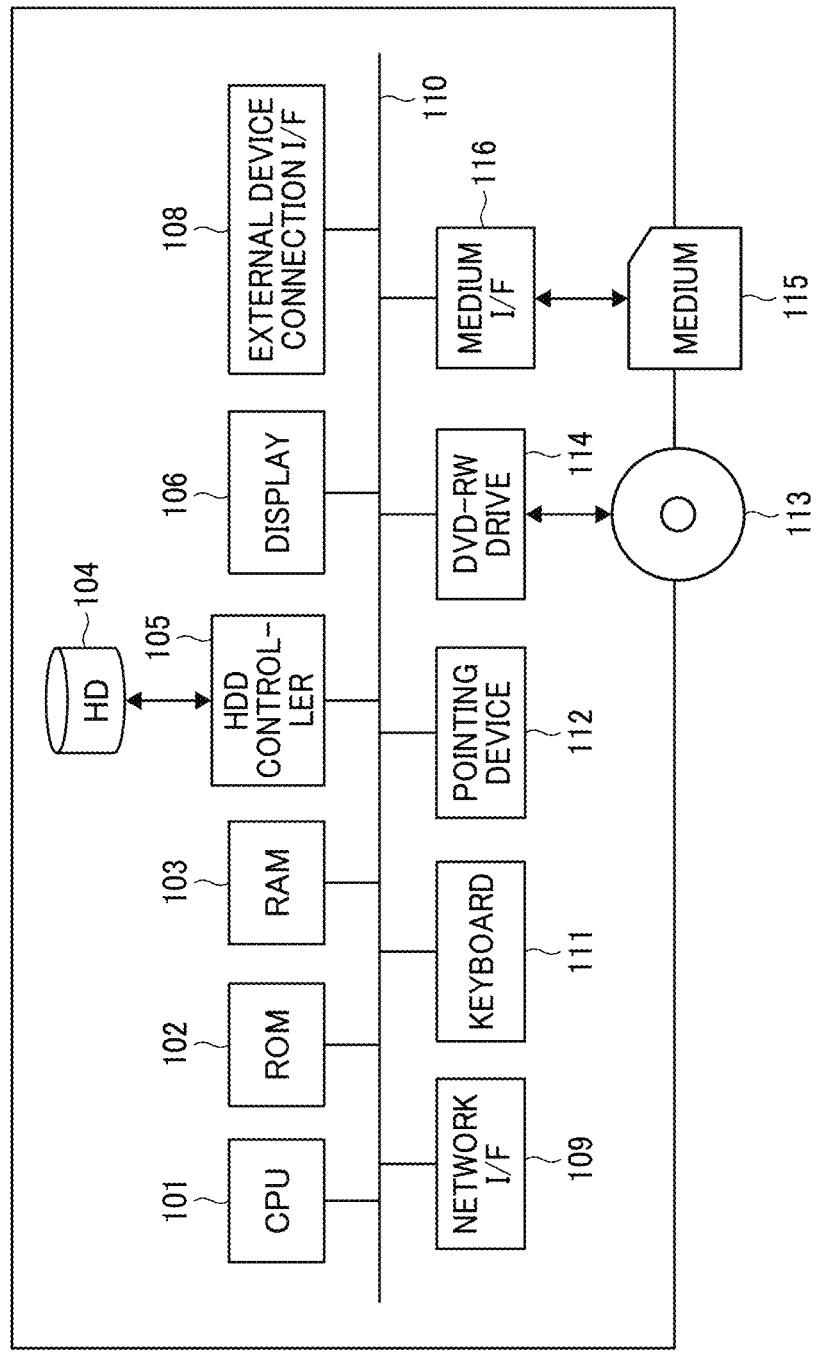
FIG. 2 is a schematic diagram illustrating a hardware configuration of a terminal or a server in the communication system of FIG. 1 according to the embodiments.

As illustrated in FIG. 2, the first terminal 1, which is implemented by a computer, includes a central processing unit (CPU) 101, a read only memory (ROM) 102, a random access memory (RAM) 103, a hard disk (HD) 104, a Hard Disk Drive (HDD) controller 105, a display 106, an external device connection interface (I/F) 108, a network I/F 109, a bus line 110, a keyboard 111, a pointing device 112, a Digital Versatile Disk Rewritable (DVD-RW) drive 114, and a medium VF 116.

Among them, the CPU 101 controls entire operation of the computer. The ROM 102 stores a program for executing the CPU 101 such as an initial program loader (IPL). The RAM 103 is used as a work area for the CPU 101. The HD 104 stores various data such as a control program. The HDD controller 105 controls reading or writing of various data from or to the HD 104 under control of the CPU 101. The display 106 displays various information such as a cursor, menu, window, character, and image. The external device connection I/F 108 is an interface for connecting the computer to various external devices. Examples of the external devices include, but not limited to, a universal serial bus (USB) memory and a printer. The network I/F 109 is an interface that controls communication of data with an external device through the communication network 100. The bus line 110 is, for example, an address bus or a data bus, which electrically connects the elements such as the CPU 101 illustrated in FIG. 2.

The keyboard 111 is one example of an input device provided with a plurality of keys for allowing a user to input characters, numerals, or various instructions. The pointing device 112 is an example of an input device that allows a user to select or execute a specific instruction, select a target for processing, or move a cursor being displayed. The DVD-RW drive 114 controls reading and writing of various data from and to a DVD-RW 113, which is an example of a removable recording medium. In alternative to the DVD-RW, any recording medium may be used such as a DVD-R, Blu-ray Disc (Registered Trademark), etc. The medium I/F 116 controls reading and writing (storing) of data from and to a recording medium 115 such as a flash memory.

The external device connection I/F may be connected to a microphone as an example of a sound collecting device, a speaker as an example of a sound output device, a camera as an example of an imaging device, etc.

In the following embodiments, the example case in which the intermediary agent C intermediates communication between the first user A1 and at least one of the operators D1 to G1 is described.

Relationships Between Companies

Referring to FIG. 3, the relationships between companies, which are examples of entities, will be described according to embodiments. FIG. 3 is a diagram illustrating relationships between companies according to the embodiments. The companies include a service user company A, a business partner company B, the intermediary agent C, a factoring service company D, an accounts receivable financing service company E, a Purchase Order (PO) financing service company F, and an estimate/quotation (quotation) financing service company G.

As illustrated in FIG. 3, the service user company A is a company that uses a service provided by the intermediary agent C, which applies financing (funds) to a financing source on behalf of the service user company A. The business partner company B is a business partner of the service user company A. In this example, the service user company A is a creditor and the business partner company B is a debtor. For example, the business partner company B may be a customer of the service user company A. The intermediary agent C is an entity that provides the service for applying funds to the service user company A.

The factoring service company D, the accounts receivable financing service company E, the PO financing service company F, and the quotation financing service company G are all examples of a financing service company that provides finance (funds), which are examples of a service company (or a service provider). Specifically, the factoring service company D is a company that provides a factoring service, in which a business sells its accounts receivable to a third party at a discount. The accounts receivable financing service company E is a company that provides an accounts receivable financing service, which allows a business to receive early payment on outstanding invoices. The PO financing service company F is a company that provides a PO financing service, which allows a business to receive funding for a pre-ordered project using the purchase order. The quotation financing service company G is a company that provides a quotation financing service, which allows a business to receive funding for estimate or quotation. The financing service company is a financing source for the service user company A.

The factoring service company D is a general term used to collectively refer to a plurality of factoring service companies D1, D2, . . . Dn. The accounts receivable financing service company E is a general term used to collectively refer to a plurality of accounts receivable financing service companies E1, E2, . . . En. The PO financing service company F is a general term used to collectively refer to a plurality of PO financing service companies F1, F2, . . . Fn. The quotation financing service company G is a general term used to collectively refer to a plurality of quotation financing service companies G1, G2, . . . Gn.

The following describes an outline of transactions, performed by the entities of FIG. 3, according to the embodiments.

First, the service user company A provides or plans to provide products or services to the business partner company B, such that accounts receivable occurs. Using a form management service provided by the intermediary agent C, the service user company A requests the intermediary agent C to send an invoice to the business partner company B (S1). The intermediary agent C issues and sends the invoice to the business partner company B (S2). The processing of S1 and S2 corresponds to the invoice issuance service by the intermediary agent C.

Further, the service user company A uses the intermediation service provided by the intermediary agent C to request the intermediary agent C to send application for financing to the financing service company (S3). The intermediary agent C uses the invoice, issued when providing the invoice issuance service to the service user company A, to apply for financing to the financing service company on behalf of the service user company A (S4). The service user company A receives financing from the financing service company (S5).

The business partner company B pays the accounts receivable in relation to the invoice, to the service user company A . . . by the due date (S6). The service user company A pays back the financing service company (S7).

Referring back to FIG. 1, the example case in which the communication system of FIG. 1 is implemented by the example case of FIG. 3 is described.

The service user company A is provided with the first terminal 1, referred to as a user terminal 1, such as a personal computer (PC) operated by a user A1. The intermediary agent C is provided with the form management server 2 and the intermediary server 3. The form management server 2 and the intermediary server 3 together form the intermediary system 4.

The factoring service company D, the accounts receivable financing service company E, the PO financing service company F, and the quotation financing service company G are respectively provided with second terminals 5d, 5e, 5f, and 5g. The second terminals 5d, 5e, 5f, and 5g are operated by the operators D1, E1, F1, and G1, respectively. Since the operator is an auditor in the following embodiments, the operators D1, E1, F1, and G1 are referred to as the auditors D1, E1, F1, and G1. Further, the second terminals 5d, 5e, 5f, and 5g operated by the auditors D1, E1, F1, and G1 are referred to as the auditor terminals 5d, 5e, 5f, and 5g.

The user terminal 1, the auditor terminals 5d, 5e, 5f, and 5g, the form management server 2, and the intermediary server 3 can communicate with each other via a communication network 100 such as the Internet. Hereinafter, the auditor terminals 5d, 5e, 5f, and 5g are collectively referred to as an "auditor terminal 5".

Functional Configuration of Communication System

Figure 4:
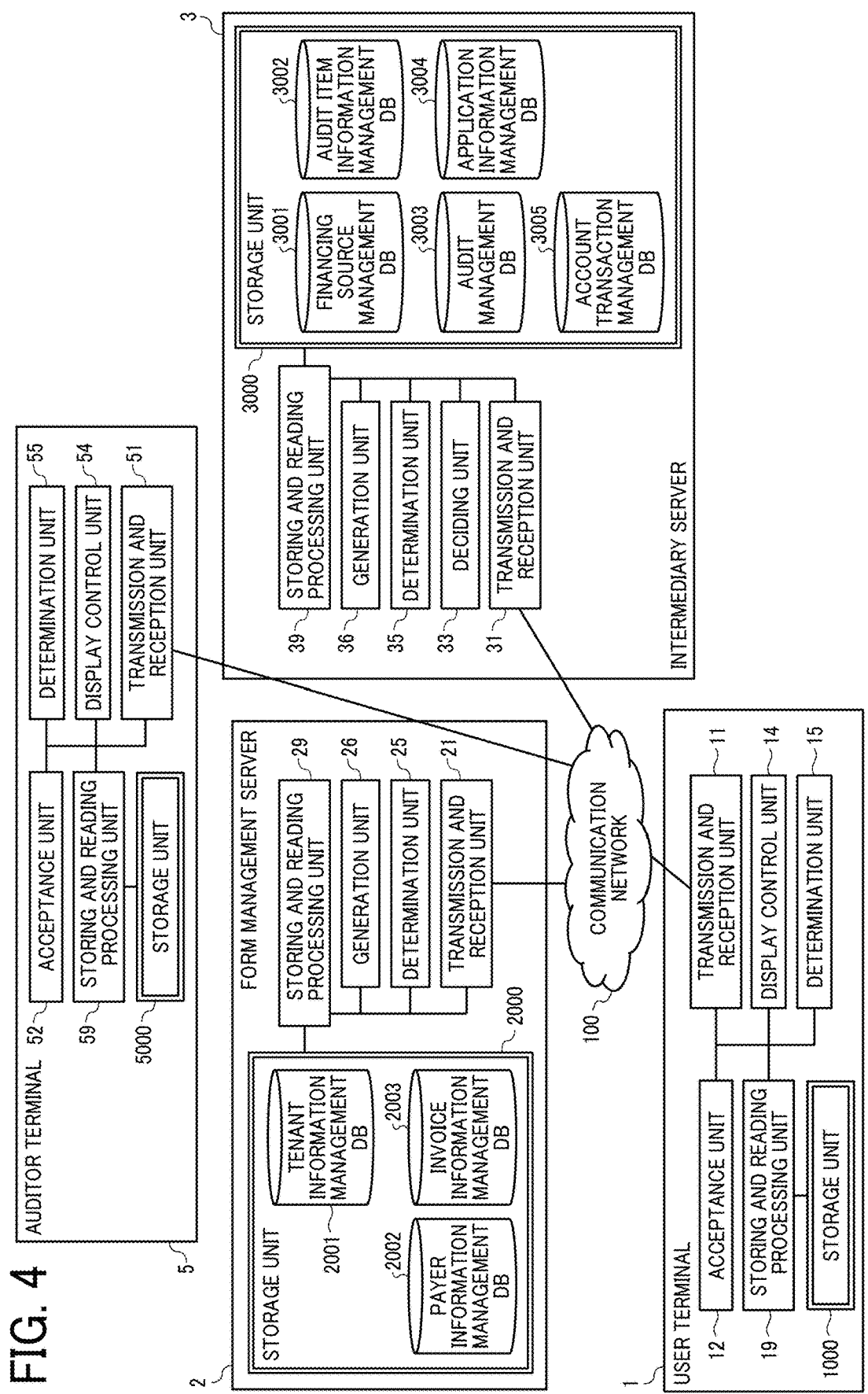
FIG. 4 is a block diagram illustrating a functional configuration of the communication system of FIG. 1 according to the embodiment.

Next, referring to FIGS. 2 to 12, a functional configuration of the communication system is described according to the embodiments. FIG. 4 is a block diagram illustrating a functional configuration of the communication system of FIG. 1 according to the embodiment.

Functional Configuration of User Terminal

Referring to FIGS. 2 and 4, a functional configuration of the user terminal 1 is described according to the embodiment. As illustrated in FIG. 4, the user terminal 1 includes a transmission and reception unit 11, an acceptance unit 12, a display control unit 14, a determination unit 15, and a storing and reading processing unit 19. These units are functions implemented by or caused to function by operating any of the hardware elements illustrated in FIG. 2 in cooperation with the instructions of the CPU 101 according to the control program expanded from the HD 104 to the RAM 103. The user terminal 1 further includes a storage unit 1000 implemented by the RAM 103 and the HD 104 illustrated in FIG. 2.

Functional Units of User Terminal

Next, functional units of the user terminal 1 will be described. The transmission and reception unit 11, which is implemented by instructions of the CPU 101, the external device connection I/F 108, and the network I/F 109 illustrated in FIG. 2, transmits or receives various types of data (or information) to or from other terminal, device, apparatus, or system through the communication network 100.

The acceptance unit 12, which is mainly implemented by the instructions from the CPU 101, the keyboard 111 and the pointing device 112, illustrated in FIG. 2, receives various inputs from the user.

The display control unit 14, which is mainly implemented by instructions from the CPU 101 illustrated in FIG. 2, outputs image data to the display 106 or an external display connected to the external device connection I/F 108 to cause an image be displayed. The display control unit 14 has a web browser function.

The determination unit 15, which is implemented by instructions of the CPU 101 illustrated in FIG. 2, has a function of making various determinations.

The storing and reading processing unit 19, which is mainly implemented by instructions from the CPU 101 and the HDD controller 105 illustrated in FIG. 2, performs processing of storing various types of information in the storage unit 1000 and reading various types of information stored in the storage unit 1000.

Functional Configuration of Form Management Server

Next, referring to FIGS. 2 to 7, a functional configuration of the form management server 2 is described according to the embodiment. As illustrated in FIG. 4, the form management server 2 includes a transmission and reception unit 21, a determination unit 25, a generation unit 26, and a storing and reading processing unit 29. These units are functions implemented by or caused to function by operating any of the hardware elements illustrated in FIG. 2 in cooperation with the instructions of the CPU 101 according to the control program expanded from the HD 104 to the RAM 103. The form management server 2 further includes a storage unit 2000 implemented by the RAM 103 and the HD 104 illustrated in FIG. 2.

Tenant Information Management Table

FIG. 5 is a conceptual diagram illustrating a tenant information management table. The storage unit 2000 stores a tenant information management DB 2001, such as the tenant management information table illustrated in FIG. 5. The table of FIG. 5 stores various information related to tenant as a service user company. In the description of the embodiment, the tenant is defined as a customer unit, more specifically . . . a unit of one or more users belonging to a group as a customer, such as a company, a business unit, an organization, etc. having a right to use a service, such as the service provided by the communication system, with an agreement or a contract, for example. The service user company A is an example of tenant. The table stores, for each tenant, a tenant ID, a tenant name (company name, trade name, etc.), a tenant address (location), a tenant industry type, a use start date of the form management service, bank account information, and connection destination information (URL, etc.) of the coordination service, in association, as tenant information.

Payer Information Management Table

FIG. 6 is a conceptual diagram illustrating an example of payer information management table. The storage unit 200 stores a payer information management DB 2002, such as the payer information management table illustrated in FIG. 6. The table of FIG. 6 stores, for each tenant as the service user company, various information regarding a company billed by the tenant (i.e., bill payer). The table of FIG. 6 stores, for each tenant ID of a tenant as a biller, a bill payer ID, a name of a bill payer (either a company or an individual), a bill payer address, a telephone number, an e-mail address, a name of a person in charge, and bank account information, in association, as bill (invoice) payer information.

Invoice Information Management Table

FIG. 7 is a conceptual diagram illustrating an example of invoice information management table. The storage unit 2000 stores an invoice information management DB 2003, such as the invoice information management table as illustrated in FIG. 7. The table of FIG. 7 stores contents of an invoice generated by the intermediary agent C on behalf of the service user company A. The table stores, for each tenant ID, an invoice number (form ID), a bill payer ID, a name of the bill payer, a billing amount, a payment due date, an image of invoice, a date sent, a payment status, a payment date, and a payment account in association . . . as invoice information. According to one implementation, the invoice information management table may store the information regarding the invoice issued by the service user company A when such information can be managed.

Functional Configuration of Form Management Server

Next, functional units of the form management server 2 are described in detail, according to the embodiment. In the following description of each functional unit of the form management server 2, a relationship of each functional unit with some elements illustrated in FIG. 2 is described.

The transmission and reception unit 21 of the form management server 2 illustrated in FIG. 4, which is implemented by instructions of the CPU 101 and the network I/F 109 illustrated in FIG. 2, transmits or receives various types of data (or information) to or from other terminal, device, apparatus, or system through the communication network 100.

The determination unit 25, which is implemented by instructions of the CPU 101 illustrated in FIG. 2, has a function of making various determinations. Details of determinations will be described later.

The generation unit 26 is implemented by instructions from the CPU 101 illustrated in FIG. 2, and generates various screens for display.

The storing and reading processing unit 29 . . . which is implemented by instructions from the CPU 101 and the HDD controller 105 illustrated in FIG. 2, performs processing of storing various types of information in the storage unit 3000 and reading various types of information stored in the storage unit 3000.

In addition to the above-described units, the form management server 2 may include a form generation unit that creates a form, such as an invoice, in request from the user A1 of the service user company A.

Functional Configuration of Intermediary Server

Next, referring to FIGS. 2, 4, and 8 to 12, a functional configuration of the intermediary server 3 is described according to the embodiment. As illustrated in FIG. 4, the intermediary server 3 includes a transmission and reception unit 31, a deciding unit 33, a determination unit 35, a generation unit 36, and a storing and reading processing unit 39. These units are functions implemented by or caused to function by operating any of the hardware elements illustrated in FIG. 2 in cooperation with the instructions of the CPU 101 according to the control program expanded from the HD 104 to the RAM 103. The intermediary server 3 further includes a storage unit 3000 implemented by the RAM 103 and the HD 104 illustrated in FIG. 2.

Financing Source Management Table

FIG. 8 is a conceptual diagram illustrating an example of financing source management table. The storage unit 3000 includes a financing source management DB 3001, such as the finance source management table as illustrated in FIG. 8. The table of FIG. 8 store various information on a financing service company as a financing source. Specifically, the table stores a type of financing source, a service name (company name), an industry type that a financing service company is specialized in, a non-applicable industry type, a coverage area, information indicating whether a private business can be financed, limit on amount of financing, and date of payment of the financing. The table further stores a user name, a password, an email address, a name of a person in charge for each financing service company. The table further stores a message to be displayed as advisement, for example . . . when the service user company A is to select a financing service company. The person in charge corresponds to the auditors D1, E1, F1, and G1 in FIG. 2.

Audit Item Information Management Table

FIG. 9 is a conceptual diagram illustrating an example of audit item information management table. The storage unit 3000 stores an audit item information management DB 3002, such as the audit item information management table as illustrated in FIG. 9. The table of FIG. 9 indicates how much period (month) of the evidence information is required for funds audit by each financing service company (service name). This table stores, for each financing service provided by a specific financing service company, information on a specific time period of evidence information in association with a service name. For example, in case the service user company A (or intermediary agent C) applies for financing to a financing service company providing a service D1, the service user company A needs to prepare information such as transactions (deposit and withdrawal) for the past six months, as evidence information for funds audit by the financing service company.

The audit items are previously registered in the audit item information management DB 3002 by an administrator of the intermediary agent C based on the audit conditions disclosed by each financing service company.

Audit Management Table

FIG. 10 is a conceptual diagram illustrating an example of audit management table. The storage unit 3000 stores an audit management DB 3003 such as an audio management table illustrated in FIG. 10. The table of FIG. 10 stores, for each financing service company, an audit status of each application for financing. The table stores, for each financing service company as a service provider, an 1D of application for financing, a preliminary audit status, a main audit status, and an audit result, in association.

Application Information Management Table

FIG. 11 is a conceptual diagram illustrating an example of application information management table. The storage unit 3000 stores an application information management DB 3004, such as application information management table illustrated in FIG. 11. The table of FIG. 11 stores various information relating to application for financing. The table stores an application ID, an invoice number (form ID), information on a service user company (biller company name, biller address), information on a business partner company (bill payer company name, bill payer address), a billing amount, a payment due date of the billing amount, an issue date of the invoice, and an application date which is a date on which an application for audit for financing based on the invoice, in association with each other.

Account Transaction Management Table

FIG. 12 is a conceptual diagram illustrating an example of account transaction management table. The storage unit 3000 stores an account transaction management DB 3005 such as an account transaction management table illustrated in FIG. 12. The table of FIG. 12 stores transaction detail information of the bank account of the service user company. Specifically, the table stores, for each tenant, a transaction date, an amount of payment, a payee, an amount of deposit, a deposit source (payer), and a balance in association for each transaction.

Functional Configuration of Auditor Terminal

Referring to FIGS. 3 and 4, a functional configuration of the auditor terminal 5 is described according to the embodiment. As illustrated in FIG. 4, the auditor terminal 5 includes a transmission and reception unit 51, an acceptance unit 52, a display control unit 54, a determination unit 55, and a storing and reading processing unit 59. These units are functions implemented by or caused to function by operating any of the hardware elements illustrated in FIG. 2 in cooperation with the instructions of the CPU 101 according to the control program expanded from the HD 104 to the RAM 103. The auditor terminal 5 further includes a storage unit 5000 implemented by the RAM 103 and the HD 104 illustrated in FIG. 2.

The transmission and reception unit 51, the acceptance unit 52, the display control unit 54, the determination unit 55, and the storing and reading processing unit 59 of the auditor terminal 5 are substantially similar in function to the transmission and reception unit 11, the acceptance unit 12, the display control unit 14, the determination unit 15, and the storing and reading processing unit 19 of the user terminal 1, and thus description thereof is omitted.

Processes and Operations

Next, referring to FIGS. 13 to 20, processing, performed by the communication system illustrating in FIG. 3, is described according to the embodiment.

Processing to Send Invoice on Behalf

Figure 13:
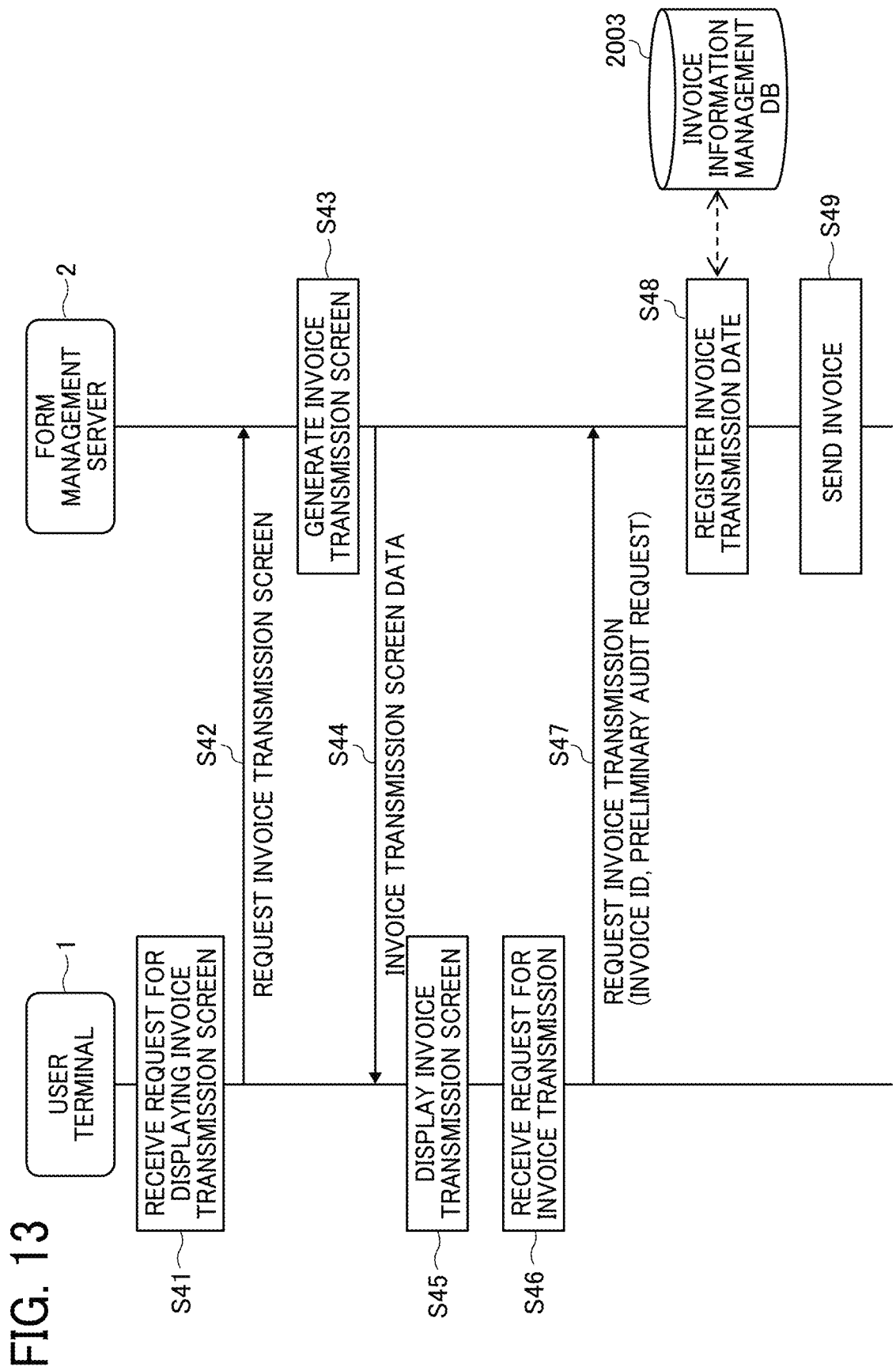
FIG. 13 is a sequence diagram illustrating example processing of sending the invoice to the business partner company by the intermediary agent on behalf of the service user company.

First, referring to FIG. 13 and FIG. 14, processing to send an invoice on behalf of the service user company, by the intermediary agent, is described according to the embodiment. FIG. 13 is a sequence diagram illustrating example processing of sending the invoice to the business partner company by the intermediary agent on behalf of the service user company. FIG. 14 is an illustration of example invoice transmission screen.

First, at the user terminal 1 of the service user company A, the acceptance unit 12 receives an operation that requests display of an invoice transmission screen from the user A1 (S41).

Specifically, the acceptance unit 12 receives an operation of the user A1 clicking a button on a predetermined screen displayed on the user terminal 1.

In one example, the predetermined screen is, for example, a screen displayed after the user terminal 1 sends a request for generating an invoice to the form management server 2. For example, the user A1 may enter various information, and request generation of an invoice based on the entered information to the form management server 2. In response to this request, the form management server 2 generates the invoice, and transmits data of a screen (referred to an invoice check screen) including an image of the invoice that is generated to the user terminal 1. Such screen may include a button that allows the user A1 to request transmission of the invoice that is generated to a bill payer. In generating the invoice, the form management server 2 registers various information in the invoice information management DB 2003.

In another example, the predetermined screen is, for example, a screen displayed after the user terminal 1 sends a request for displaying one or more invoices previously issued by the user A1, to the form management server 2. In such case, the form management server 2 refers to the invoice information management table 2003 to obtain information on the invoices issued by the user A1 for display. The form management server 2 may generate a screen including the obtained information on the invoices, and allows the user A1 to select a particular invoice to display an image or request transmission.

Further, the acceptance unit 12 receives authentication information such as a tenant ID input by the user A1, before receiving the operation for requesting display of a screen (such as the invoice check screen or the invoice transmission screen) from the user A1. Then, the transmission and reception unit 11 transmits the authentication information to the form management server 2. The form management server 2 performs authentication using the authentication information. When the user A1 is authenticated, the acceptance unit 12 receives the operation for requesting display of the screen (such as the invoice check screen or the invoice transmission screen) from the user A1.

Next, the transmission and reception unit 11 of the user terminal 1 transmits a request for invoice transmission screen to the form management server 2 (S42). In this example, along with the request for invoice transmission screen, the invoice ID for identifying the particular invoice for transmission is transmitted. Accordingly, the transmission and reception unit 21 of the form management server 2 receives the request for the invoice transmission screen.

At the form management server 2, the generation unit 26 generates data of the invoice transmission screen as illustrated in FIG. 14 in response to the request for the invoice transmission screen (S43). The transmission and reception unit 21 transmits the screen data, generated, to the user terminal 1 (S44). The display control unit 14 of the user terminal 1 displays the invoice transmission screen on the display 106 based on the transmitted screen data (S45).

FIG. 14 is an illustration of an example of the invoice transmission screen displayed on the user terminal 1. As illustrated in FIG. 14, the invoice transmission screen includes a plurality of items, such as a first check box c21 for setting whether or not to request a preliminary audit for financing based on the invoice to be transmitted, a second check box c22 for setting whether or not to send the invoice by mail, and an instruction button b21 for instructing transmission of the invoice. The invoice transmission screen further includes a subject and a message (body) of an email to be transmitted with the invoice. The subject and the body of email may contain preset information, or may contain contents input by the user A via a certain screen. The invoice transmission screen further displays an icon representing an attachment file 121, which is an image of the invoice to be transmitted. The invoice number and the total of the invoice are also displayed.

Through the invoice transmission screen, the user A1 enters or selects an e-mail address of a transmission destination of email, selects whether or not to request a preliminary audit for financing based on the invoice to be sent using the first check box c21, selects whether or not to send the invoice by mail using the second check box c22, and finally clicks the instruction button b21 to instruct transmission of the invoice. The acceptance unit 12 of the user terminal 1 receives an operation for requesting transmission of the invoice (S46).

Next, the transmission and reception unit 11 of the user terminal 1 transmits the request for transmission of invoice, an invoice number of the invoice, and information indicating whether to request preliminary audit for financing based on the invoice, to the form management server 2 (S47).

Next, at the form management server 2, the storing and reading processing unit 29 searches the invoice information management DB 2003 by using the transmitted invoice number as a search key, to specify invoice information that matches the invoice number. The storing and reading processing unit 29 registers the date on which the transmission of invoice is instructed, as a value of the "date sent" item included in the invoice information (48).

The transmission and reception unit 21 of the form management server 2 transmits an e-mail, attached with an image of the invoice as an attachment file, to the destination e-mail address set by the user A1 (S49). Further, in case sending the invoice by mail is selected by the second check box c22, the transmission and reception unit 21 transmits the image of the invoice to a printer and instructs the printer to print out the image of the invoice. The printed invoice may be sent from the form management server 2 to the bill payer, such as the business partner company B, by mail.

Processing to Send Application on Behalf

Figure 15:
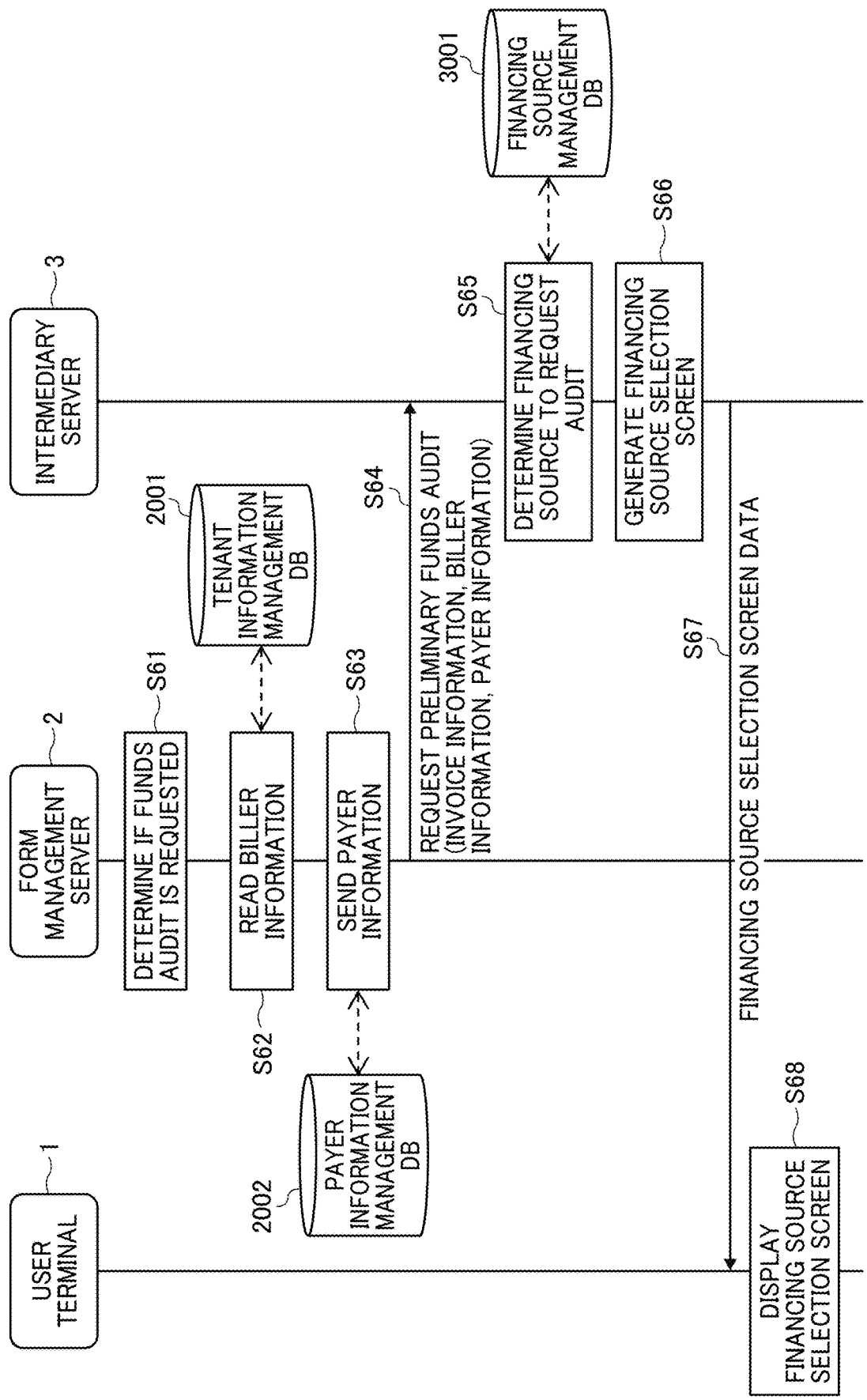
FIG. 15 is a sequence diagram illustrating example processing of sending the invoice to the business partner company by the intermediary agent on behalf of the service user company.

Referring next to FIGS. 15 and 16, processing of transmitting application for financing on behalf of the service user company A, is described according to the embodiment. FIG. 15 is a sequence diagram illustrating example processing of sending application for financing by the intermediary agent on behalf of the service user company. FIG. 16 is an illustration of an example of financing source selection screen.

Figure 25:
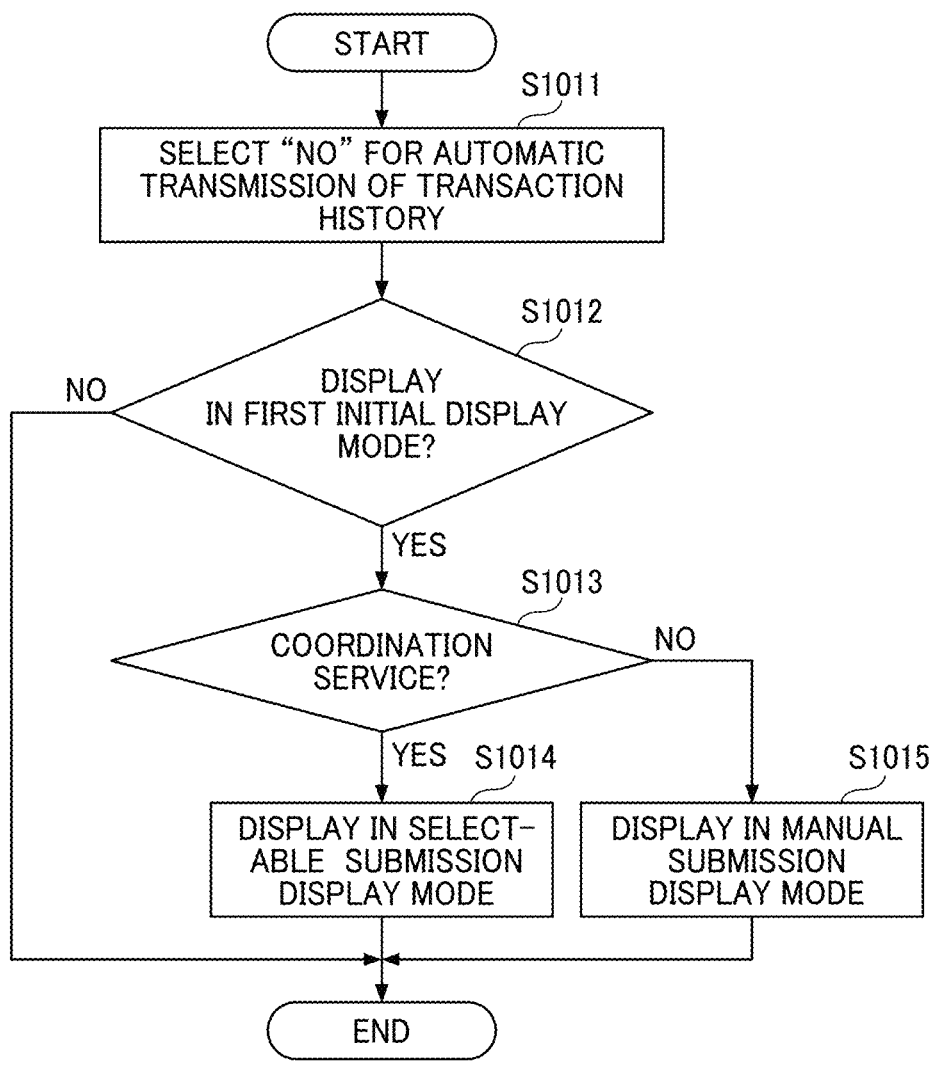
FIG. 25 is a flowchart illustrating processing of changing display of the preliminary audit information registration screen, according to the modified example.

First, at the form management server 2, the determination unit 25 determines whether or not audit for financing has been requested, according to information indicating whether or not preliminary audit of financing based on the invoice is requested, which is transmitted from the user terminal 1 (S61). That is, the determination unit 25 determines that audit for financing is requested when the user A1 instructs to send the invoice with the first check box c21 checked on the invoice transmission screen. The determination unit 25 determines that audit for financing is not requested when the user A1 instructs to send the invoice with the first check box c21 unchecked on the invoice transmission screen. In the following, the example case in which the determination unit 25 determines that audit for financing is requested is described. If audit for financing is not requested, the operation of FIG. 25 is not performed.

Next, the storing and reading processing unit 29 searches the tenant information management DB 2001 using the tenant ID of the user A1 as a search key, and reads the tenant information corresponding to the tenant ID as the biller information (S62). Then, the storing and reading processing unit 29 reads information on the invoice (i.e., invoice number) specified at S61 as a subject for financing, and obtains a bill payer ID that matches the invoice number from the invoice information management DB 2003. The storing and reading processing unit 29 further searches the payer information management DB 2002 using the bill payer ID that is obtained as a search key, to read the payer information that matches the bill payer ID (S63).

Next, the transmission and reception unit 21 transmits the request for the preliminary audit for financing, the invoice information obtained at S61, the biller information obtained at S62, and the payer information obtained at S63 to the intermediary server 3.

At the intermediary server 3, the determination unit 33 determines a financing source to which the request for audit can be made, based on the transmitted biller information (S65). Specifically, the determination unit 33 determines whether or not a business type of the biller is a private business based on the company name and the trade name of the biller information, and acquires the address and the industry type from the biller information. Then, the storing and reading processing unit 39 selects one or more records of financing source information that matches the business type of the biller, an area identified by the biller address, and the industry type, from among the financing source information registered in the financing source management DB 3001. The determination unit 33 determines a financing source corresponding to the read financing source information, as a financing source to which the request for audit is made. More than one financing source may be determined.

Next, the generation unit 36 of the intermediary server 3 generates data of a financing source selection screen based on the financing source information of the selected financing source (S66). Specifically, the generation unit 36 generates data of a screen including a list of financing sources, with a service name and an advertisement message, which are included in the financing source information. The transmission and reception unit 31 transmits the generated screen data to the user terminal 1 (S67). The display control unit 14 of the user terminal 1 displays a financing source selection screen on the display 106 based on the transmitted screen data (S68).

FIG. 16 is an illustration of an example financing source selection screen displayed on the user terminal 1. As illustrated in FIG. 16, the financing source selection screen includes, for each candidate of financing source, a service name, an advisement message, and a check box (c31, c32, c33, c34, or c35) for allowing selection by the user. The financing source selection screen further includes a button b31 for confirming selection of a financing source to apply for preliminary audit and transitioning to a next screen. The user A1 can select one or more financing sources to request preliminary audit for financing, by checking a check box corresponding to the financing source to be selected, and clicks the button b31.

Processing to Register Preliminary Audit Information

Referring next to FIGS. 17, 18, and 19, processing of registering preliminary audit information is described according to the embodiment. FIG. 17 is a sequence diagram illustrating processing of registering preliminary audit information, according to the embodiment. FIG. 18 is an illustration of an example of preliminary audit information registration screen. FIG. 19 is an illustration of an invoice check screen.

First, at the user terminal 1, the acceptance unit 12 receives an operation of selecting a financing source (S81). Specifically, the acceptance unit 12 receives an operation of checking a check box corresponding to the financing source being selected and an operation of clicking the button b31. Then, the transmission and reception unit 11 transmits a request for audit information registration screen and a service name of the selected financing source to the intermediary server 3 (S82).

Next, at the intermediary server 3, the determination unit 33 determines, for how much period of time, the documents are needed as evidence information for audit. Specifically, the storing and reading processing unit 39 searches the audit item information management table using the transmitted service name of the financing source as a search key, and reads a period for evidence information corresponding to the service name. Then, the determining unit 33 determines the longest period, from among the periods for evidence information that have been read, as a period for evidence information necessary for audit. For example, when the user A1 selects a service D1, a service D2, a service D3, and a service D4, the storing and reading processing unit 39 obtains the period for evidence information of 6 months, 24 months, 12 months, and 7 months, respectively, for the services D1, D2, D3, and D4. Of those periods for evidence information, the determination unit 33 determines the longest period for evidence information, that is, 24 months, as the period for evidence information necessary for audit (S83).

Next, the transmission and reception unit 31 of the intermediary server 3 transmits a request for first audit information, the biller ID, the bill payer ID, and the period for evidence information that is determined, to the form management server 2 (S84). The first audit information is information indicating a history of transactions between the service user company A and the business partner company B. Examples of the first audit information include, but not limited to, invoice information of an invoice issued by the service user company A to the business partner company B, and information indicating a status of payment from the business partner company B to the service user company A for an amount issued by the invoice.

Next, the storing and reading processing unit 29 of the form management server 2 determines a range of invoice information to be read based on the period for evidence information that is transmitted and the current date. That is, a range of "date sent" indicated by the invoice information is specified. For example, when the period for evidence information is "24 months", a range from the current date to 24 months before the current date is specified. The storing and reading processing unit 29 searches the invoice information management DB 2003 using the biller ID, the bill payer ID, and specified range of "date sent" as search keys, to read the invoice information including the biller ID and the bill payer ID within the range determined by the period for evidence information as the first audit information (S85).

Next, the transmission and reception unit 21 of the form management server 2 transmits the first audit information that is read to the intermediary server 3 (S86). Then, at the intermediary server 3, the generation unit 36 generates data of preliminary audit information registration screen, which includes an invoice number and information indicating whether or not the coordination service is used, based on the invoice information, the biller information, and the bill payer information transmitted at S64 and the first audit information transmitted at S86 (S87). The transmission and reception unit 31 transmits the generated screen data to the user terminal 1 (S88).

Next, at the user terminal 1, the display control unit 14 displays the preliminary audit information registration screen on the display 106 based on the transmitted screen data (S89).

FIG. 18 is an illustration of an example preliminary audit information registration screen displayed on the user terminal 1. As illustrated in FIG. 18, the preliminary audit information registration screen includes a field f41 indicating an invoice number, a check button b41 for checking an image of invoice, a registration button b42 for registering a financial statement, a registration button b43 for registering a master contract, a setting area a41 for setting a way to submit evidence information, a back button b48 for returning to the previous page, and an apply button b49 for applying. The preliminary audit information registration screen further includes biller information such as a company name and an address of a biller, and bill payer information such as a company name and an address of a bill payer (seller information). The setting area a41 further includes radio buttons for allowing the user A1 to set whether or not to automatically transmit the transaction history. The radio buttons include a radio button r41 that is selected to allow automatic transmission, and a radio button r42 that is selected not to allow automatic transmission.

Subsequently, at the user terminal 1, the acceptance unit 12 receives an operation for instructing acquisition of an image of invoice (S90). Specifically, the acceptance unit 12 receives an operation of clicking the check button b41. Then, the transmission and reception unit 11 transmits the request for the image of invoice and the invoice number of the invoice to be requested to the form management server 2 (S91).

Next, at the form management server 2, the storing and reading processing unit 29 searches the invoice information management DB 2003 using the transmitted invoice number as a search key to specify a storage destination of the image of invoice that matches the invoice number, and reads the image of invoice from the specified storage destination (S92). The transmission and reception unit 21 transmits the invoice image, which is read, to the user terminal 1 (693).

The display control unit 14 of the user terminal 1 displays an invoice check screen including the transmitted image of invoice (S94). FIG. 19 is an illustration of an example invoice check screen displayed on the user terminal 1. As illustrated in FIG. 19, the invoice check screen includes an image of invoice (invoice image) g51 and an OK button b51. When the user A1 checks the invoice image g51 and clicks the OK button b51, the invoice check screen is closed, and the preliminary audit information registration screen is displayed.

Processing to Intermediate a Request for Preliminary Audit

Figure 20:
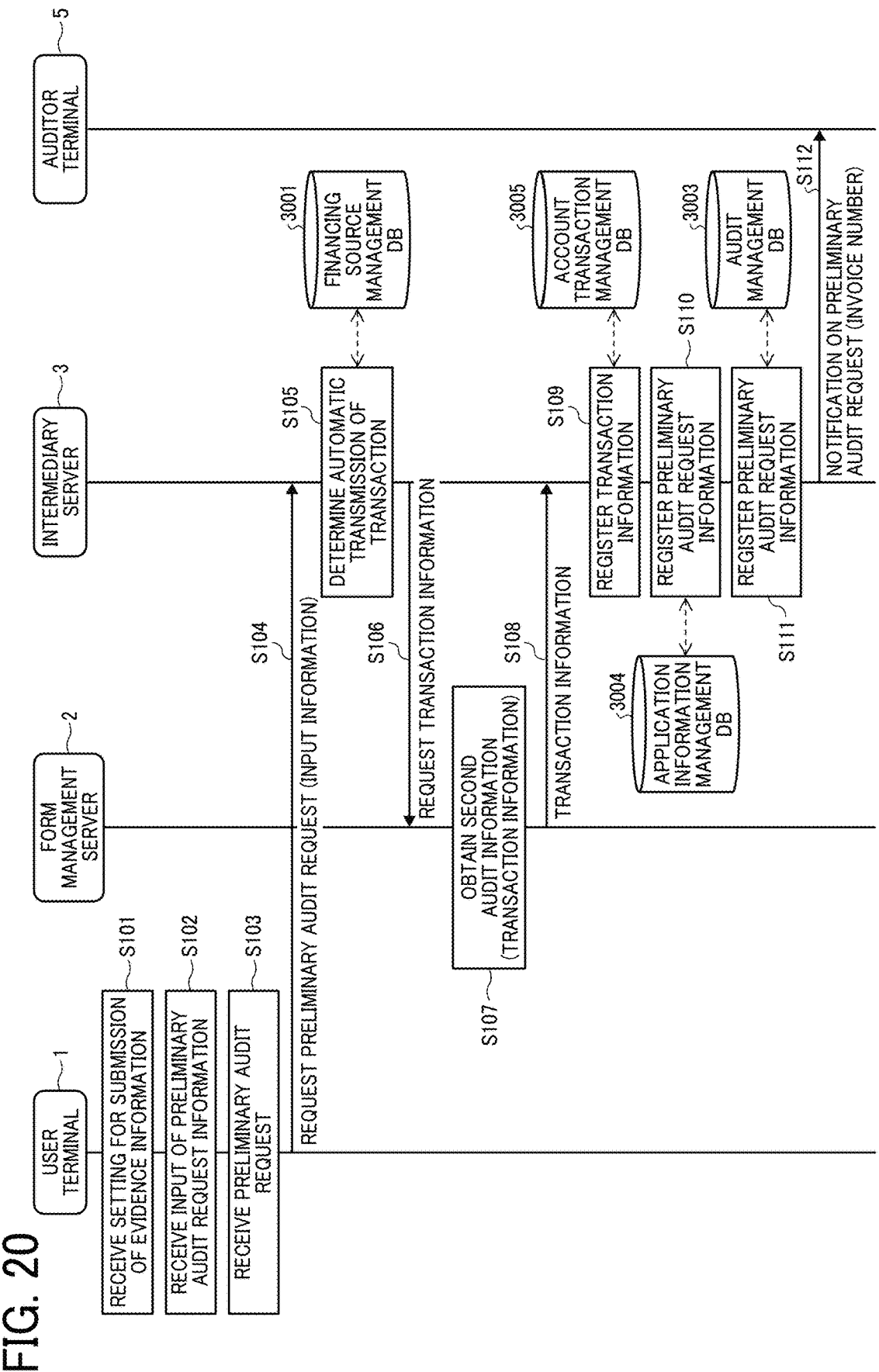
FIG. 20 is an illustration of an invoice check screen.

Referring next to FIG. 20, processing of intermediating application of preliminary audit is described according to the embodiment. FIG. 20 is a sequence diagram illustrating processing of intermediating application of preliminary audit, according to the embodiment.

First, at the user terminal 1, the acceptance unit 12 receives an operation for setting a way to submit documents as evidence information (S101). Specifically, the acceptance unit 12 receives an operation of selecting either one of "YES" radio button r41 and "NO" radio button r42. When the r41 "YES" radio button is selected, audit is performed using the first audit information received by the intermediary server 3 at S88. On the other hand, when the "NO" radio button r42 is selected, audit is performed using second audit information described later.

Next, the acceptance unit 12 receives an operation of inputting preliminary audit information (S102). Specifically, the acceptance unit 12 receives an operation of pressing the registration button b42, and receives an operation of selecting an image of financial statement to be registered. In addition, the acceptance unit 12 receives an operation of pressing the registration button b43, and receives an operation of selecting an image of master contract to be registered. Further, the acceptance unit 12 may receive operations for correcting biller (your company) information such as a company name and an address of the biller, and bill payer (customer) information such as a company name and an address of the bill payer. Entry of information necessary for the preliminary audit then ends.

Next, the acceptance unit 12 receives an operation for requesting preliminary audit (S103). Specifically, the acceptance unit 12 receives an operation of clicking the apply button b49. When the back button b48 is clicked, the screen is switched to the financing source selection screen of FIG. 16. The transmission and reception unit 11 transmits the request for preliminary audit and the information entered via the preliminary audit information registration screen to the intermediary server 3 (S104).

Next, at the intermediary server 3, the determination unit 35 determines whether or not automatic transmission of transactions is selected, based on the transmitted entered information (S105). Specifically, such determination is made based on the information indicating whether or not automatic transmission of transaction history is selected in the entered information. The determination unit 35 determines that automatic transmission of transactions is not selected when the entered information indicates non-selection of automatic transmission of the transaction history. The determination unit 35 determines that automatic transmission of transactions is selected when the entered information indicates selection of automatic transmission of the transaction history. The following describes the example case in which automatic transmission of transactions is selected.

The transmission and reception unit 31 of the intermediary server 3 transmits the request for transaction information and the tenant ID to the form management server 2 (S106). Then, at the form management server 2, the storing and reading processing unit 29 acquires the transaction information corresponding to the transmitted tenant ID (S107). The transmission and reception unit 21 transmits the acquired transaction information to the intermediary server 3 (S108).

Next, at the intermediary server 3, the storing and reading processing unit 39 registers the received transaction information in the financing service management DB 3005 in association with the tenant ID (S109). Further, the storing and reading processing unit 39 registers the preliminary audit request information in the application information management DB 3004 (S110). Specifically, the storing and reading processing unit 39 registers various information including the invoice information received at S64 and the entered information received at S104, in the application information management DB 3004, in association with an application ID for identifying the preliminary audit request information to be registered. Further, the storing and reading processing unit 39 registers information such as the application ID of the preliminary audit request information registered in the application information management DB 3004, in the audit management DB 3003, for each service for which audit is requested (S111). In this example, the storing and reading processing unit 39 registers "auditing" as a value of the preliminary audit status item, and "null" as each of the values of the main audit status item and the audit result item (no data is entered).

The transmission and reception unit 31 of the intermediary server 3 transmits the registered preliminary audit request information and preliminary audit request notification to the auditor terminal 5 (S112). Specifically, the storing and reading processing unit 39 acquires email addresses respectively corresponding to the services for which the audit is requested, from the financing source management DB 3001. The transmission and reception unit 31 generates an email including the registered preliminary audit request information and transmits the email to each of the acquired email addresses. The way to transmit the preliminary audit request information and the preliminary audit request notification is not limited to email transmission. For example, a message including the preliminary audit request information may be transmitted to the auditor terminal 5 via a messenger application.

Thereafter, the auditor performs preliminary auditing based on the preliminary audit request information transmitted to the auditor terminal 5, and registers the result of preliminary audit in the audit management DB 3003.

Processing to Initially Display Preliminary Audit Information Registration Screen The preliminary audit information registration screen illustrated in FIG. 18 allows selection of whether or not to automatically transmit the transaction history as evidence information. Based on the information entered via the preliminary audit information registration screen, the intermediary server 3 determines whether or not to automatically transmit transactions (see S105). The following describes a modified example in which the preliminary audit information registration screen allows selection of whether or not to automatically transmit transactions, and further allows manual transmission of transactions.

Application Information Management Table

FIG. 21 is a conceptual diagram illustrating an example of application information management table, according to the modified example. The application information management table stores an application ID, an invoice number (form ID), information on a service user company (biller company name, biller address, biller email address), information on a business partner company (bill payer company name, bill payer address), a billing amount, a payment due date of the billing amount, an issue date of the invoice, and an application date which is a date on which an application for audit for financing based on the invoice, in association with each other. The application information management table further stores a storage destination of transaction information image, a storage destination of master contract image, and a storage destination of financial statement image, in association with the application ID.

Figure 22:
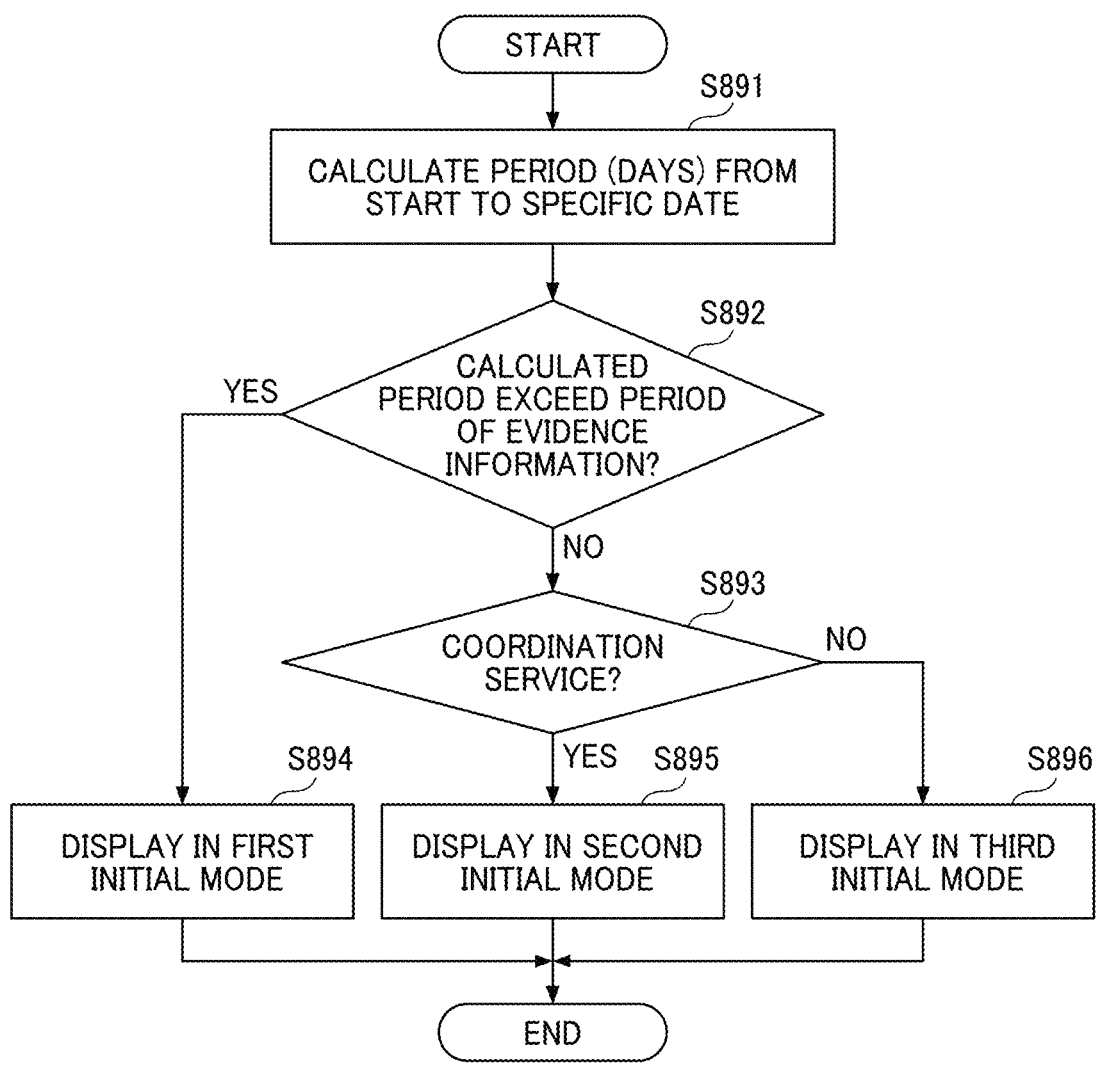
FIG. 22 is a flowchart illustrating processing of initially displaying the preliminary audit information registration screen, according to the modified example.

Next, referring to FIGS. 22 to 24, processing to display a preliminary audit information registration screen is described according to the modified example. FIG. 22 is a flowchart illustrating processing of initially displaying the preliminary audit information registration screen, according to the modified example. The flowchart illustrated in FIG. 22 is executed when the display control unit 14 displays the preliminary audit information registration screen at S89.

First, at the user terminal 1, the determination unit 15 calculates a period from the use start date of the tenant to a preset date (S891). In the modified example, at S87, the generation unit 36 of the intermediary server 3 causes the data of the preliminary audit information registration screen to include a use start date of the service user company A and a period for evidence information necessary for audit. The preset date is a date used as a reference for calculating a period from the use start date, and is, for example, the current date, the last date of the month, or the first date of the month.

Next, the determination unit 15 of the user terminal 1 determines whether or not the period calculated at S891 has exceeded the period for evidence information necessary for audit (S892). When the calculated period is equal to or less than the period for evidence information necessary for audit (NO at S892), the determination unit 15 determines whether or not a coordination service is used, based on information indicating whether or not to use the coordination service, included in data of the preliminary audit information registration screen (S893). On the other hand, when the calculated period exceeds the period for evidence information necessary for audit (YES at 892), the display control unit 14 displays the preliminary audit information registration screen on the display 106 in a first initial display mode (S894).

When it is determined that coordination service is used at step S893 (YES), the display control unit 14 displays the preliminary audit information registration screen on the display 106 in a second initial display mode (S895). On the other hand, when it is determined that coordination service is not used at S893 (NO), the display control unit 14 displays the preliminary audit information registration screen on the display 106 in a third initial display mode (S896).

FIG. 18 is an illustration of an example of preliminary audit information registration screen displayed in the first initial display mode. As illustrated in FIG. 18, in the first initial display mode, the setting area a41 includes a radio button r41 indicating "YES" and a radio button r42 indicating "NO", each of which is selectable, for automatic transmission of transactions. In the first initial display mode, the radio button r41 indicating "YES" is displayed in the selected state.

FIG. 23 is an illustration of an example of preliminary audit information registration screen displayed in the second initial display mode. As illustrated in FIG. 23, the preliminary audit information registration screen in the second initial display mode, includes, in addition to the radio buttons r41 and r42, a radio button r43 indicating automatic transmission of transactions, a radio button r44 indicating manual transmission of transactions, and a registration button b44 for registering transaction information in the setting area a41. In the second initial display mode, the radio button r41 indicating "YES" and the radio button r43 indicating automatic transmission of transactions are each displayed in the selected state. The registration button b44 is initially displayed in a state that is not selectable. The registration button b44 is made selectable when the radio button r44 indicating manual transmission of transactions is selected.

FIG. 24 is an illustration of an example of preliminary audit information registration screen displayed in the third initial display mode. As illustrated in FIG. 24, the preliminary audit information registration screen in the third initial display mode, includes, in addition to the radio buttons r41 and r42, a registration button b44 for registering transaction information in the setting area a41.

Processing to change display of preliminary audit information registration screen Next, referring to FIGS. 25 to 27, processing to change display of a preliminary audit information registration screen is described according to the modified example. FIG. 25 is a flowchart illustrating processing of changing display of the preliminary audit information registration screen, according to the modified example. The flowchart illustrated in FIG. 25 is executed when the acceptance unit 12 receives an operation of selecting the radio button r42 indicating "NO" for automatic transmission of transactions at S101.

First, at the user terminal 1, the acceptance unit 12 receives an operation of selecting the radio button r42 indicating "NO" for automatic transmission of transactions (S1011). Next, the determination unit 15 determines whether or not the preliminary audit information registration screen is displayed in the first initial display mode (S1012). When it is determined that the preliminary audit information registration screen is displayed in the first initial display mode (YES), the determination unit 15 determines whether or not coordination service is used based on information indicating whether or not coordination service is used, included in the data of the preliminary audit information registration screen (S1013). On the other hand, when the preliminary audit information registration screen is not displayed in the first initial display mode (NO), processing ends.

When it is determined that coordination service is used at S1013 (YES), the display control unit 14 redisplays the preliminary audit information registration screen on the display 106 in a manner so that a submission method is selectable (S1014). On the other hand, when it is determined that coordination service is not used at S1013 (NO), the display control unit 14 redisplays the preliminary audit information registration screen on the display 106, while manual transmission is being selected (S1015).

FIG. 26 is an illustration of an example of preliminary audit information registration screen displayed in a display mode, such that a submission method is selectable ("selectable submission display mode"). As illustrated in FIG. 26, the preliminary audit information registration screen in the selectable submission display mode, includes, in addition to the radio buttons r41 and r42, a radio button r43 indicating automatic transmission of transactions, a radio button r44 indicating manual transmission of transactions, and a registration button b44 for registering transaction information in the setting area a41. In the selectable submission display mode, the radio button r42 indicating "NO" and the radio button r43 indicating automatic transmission of transactions are each displayed in the selected state.

FIG. 27 is an illustration of an example of preliminary audit information registration screen displayed, while manual transmission is being selected ("manual submission display mode"). As illustrated in FIG. 27, the preliminary audit information registration screen in the manual submission display mode, includes, in addition to the radio buttons r41 and r42, a registration button b44 for registering transaction information in the setting area a41.

Processing to Register Preliminary Audit Result

Figure 28:
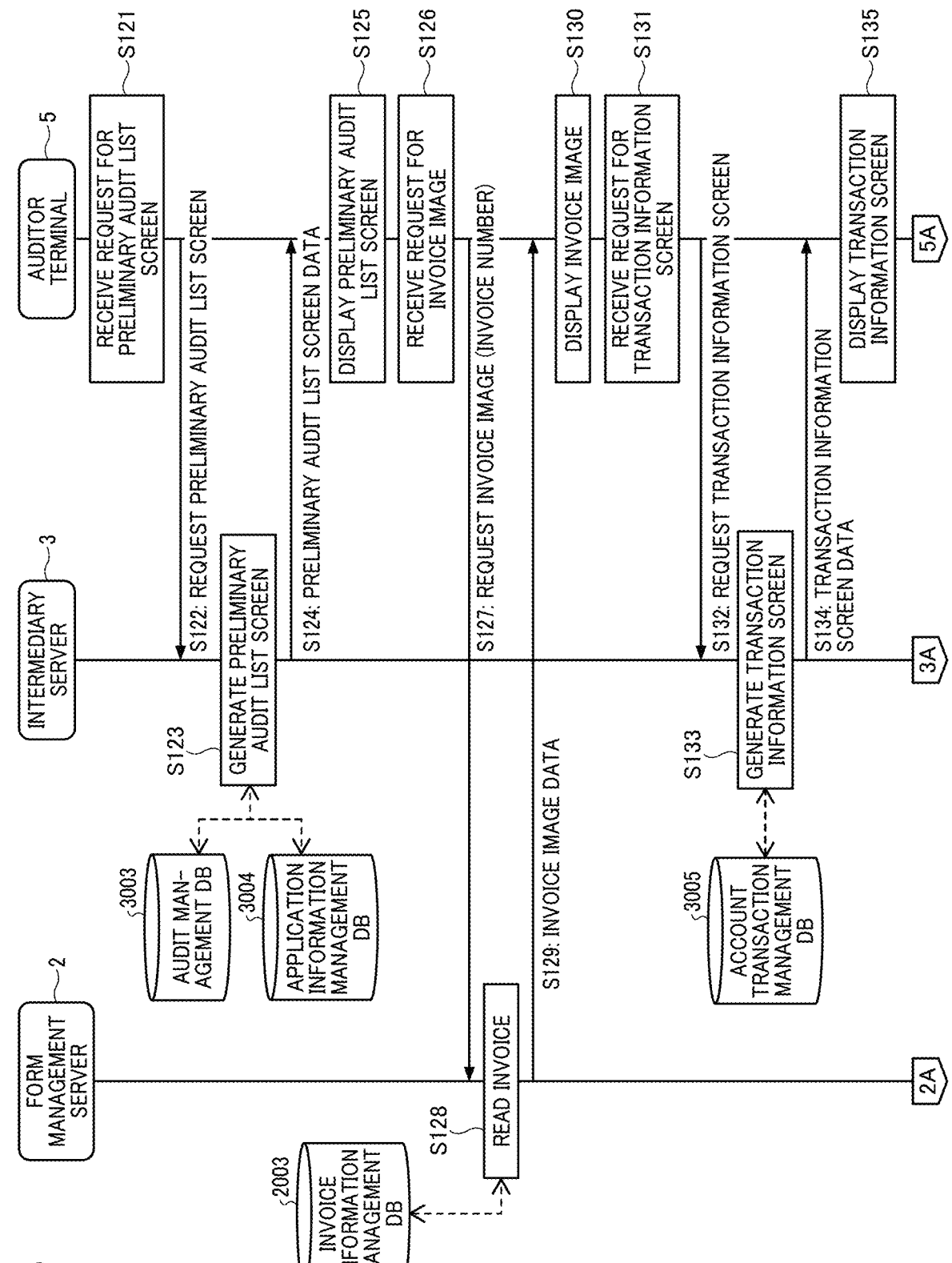
FIG. 28 is a sequence diagram illustrating processing of registering preliminary audit result, according to the embodiment.
Figure 29:
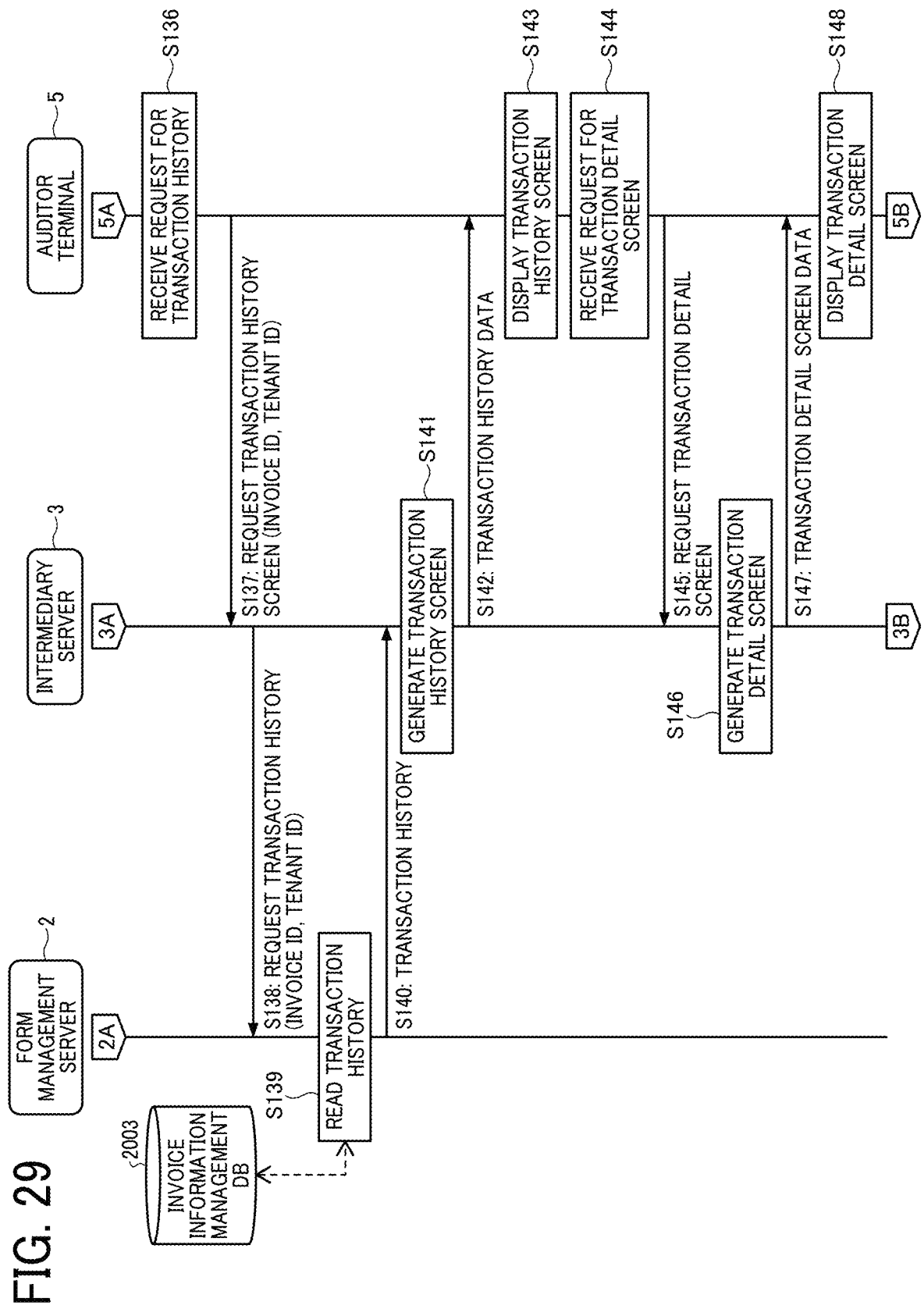
FIG. 29 is another sequence diagram illustrating processing of registering preliminary audit information, according to the embodiment.
Figure 30:
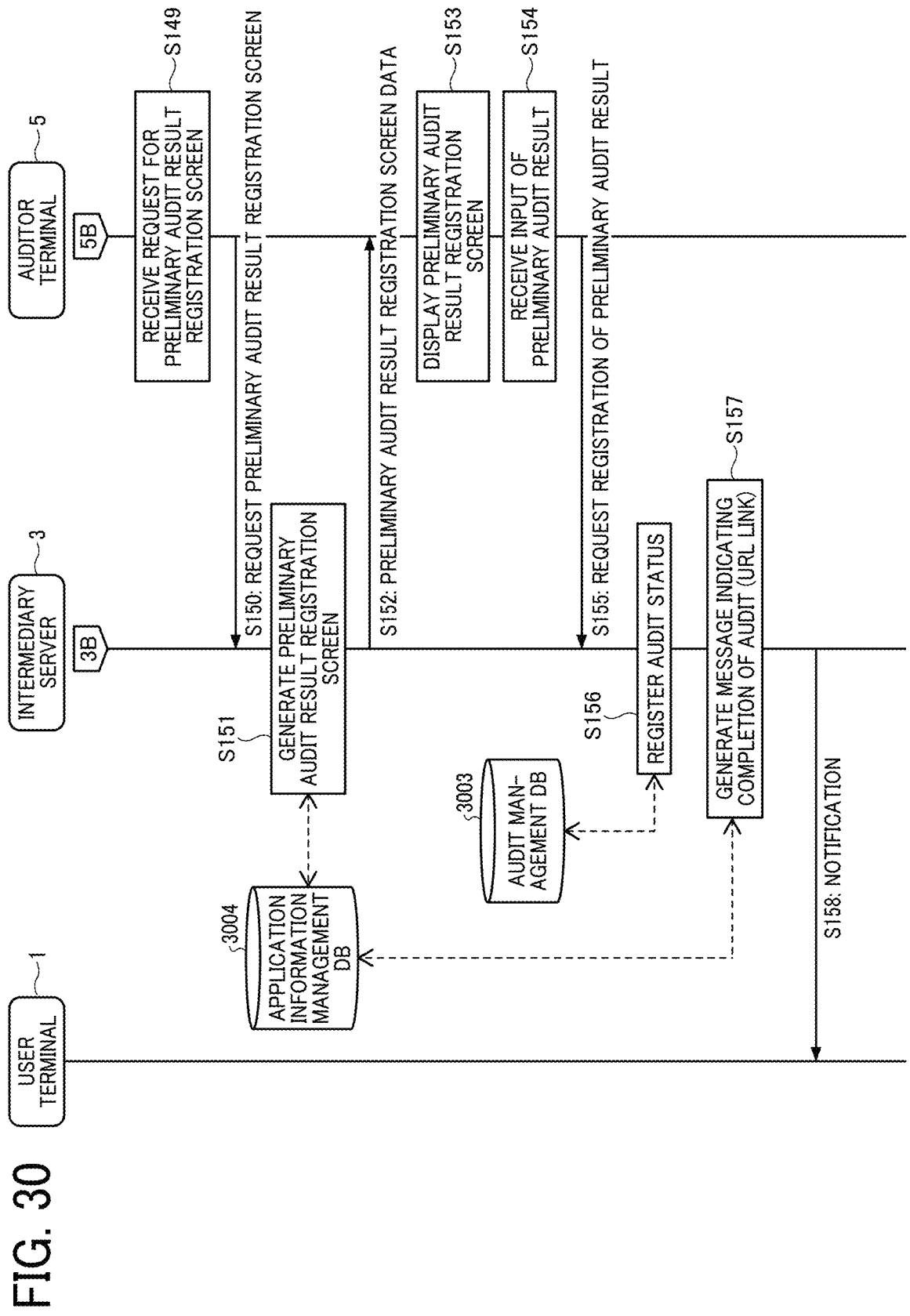
FIG. 30 is another sequence diagram illustrating processing of registering preliminary audit information, according to the embodiment.

Referring next to FIG. 28 to FIG. 36, processing of registering a result of preliminary audit is described according to the embodiment. FIGS. 28 to 30 are a sequence diagram illustrating processing of performing preliminary audit based on the preliminary audit request information and registering the result of preliminary audit, according to the embodiment.

First, at the auditor terminal 5 of the financing service company, the acceptance unit 52 receives an operation for requesting display of a preliminary audit list screen from the auditor (S121). Specifically, the acceptance unit 52 receives an operation of clicking a button included in a certain screen displayed on the auditor terminal 5, by the auditor. The acceptance unit 52 receives authentication information input by the auditor before receiving the operation for requesting display of the preliminary audit list screen from the auditor. Then, the transmission and reception unit 51 transmits the authentication information to the intermediary server 3. The intermediary server 3 performs predetermined authentication processing, using the authentication information. When the auditor is authenticated, the acceptance unit 52 receives the operation for requesting display of the preliminary audit list screen from the auditor.

Next, the transmission and reception unit 51 of the auditor terminal 5 transmits a request for preliminary audit list screen to the intermediary server 3 (S122). Accordingly, the transmission and reception unit 31 of the intermediary server 3 receives the request for preliminary audit list screen.

Figure 31:
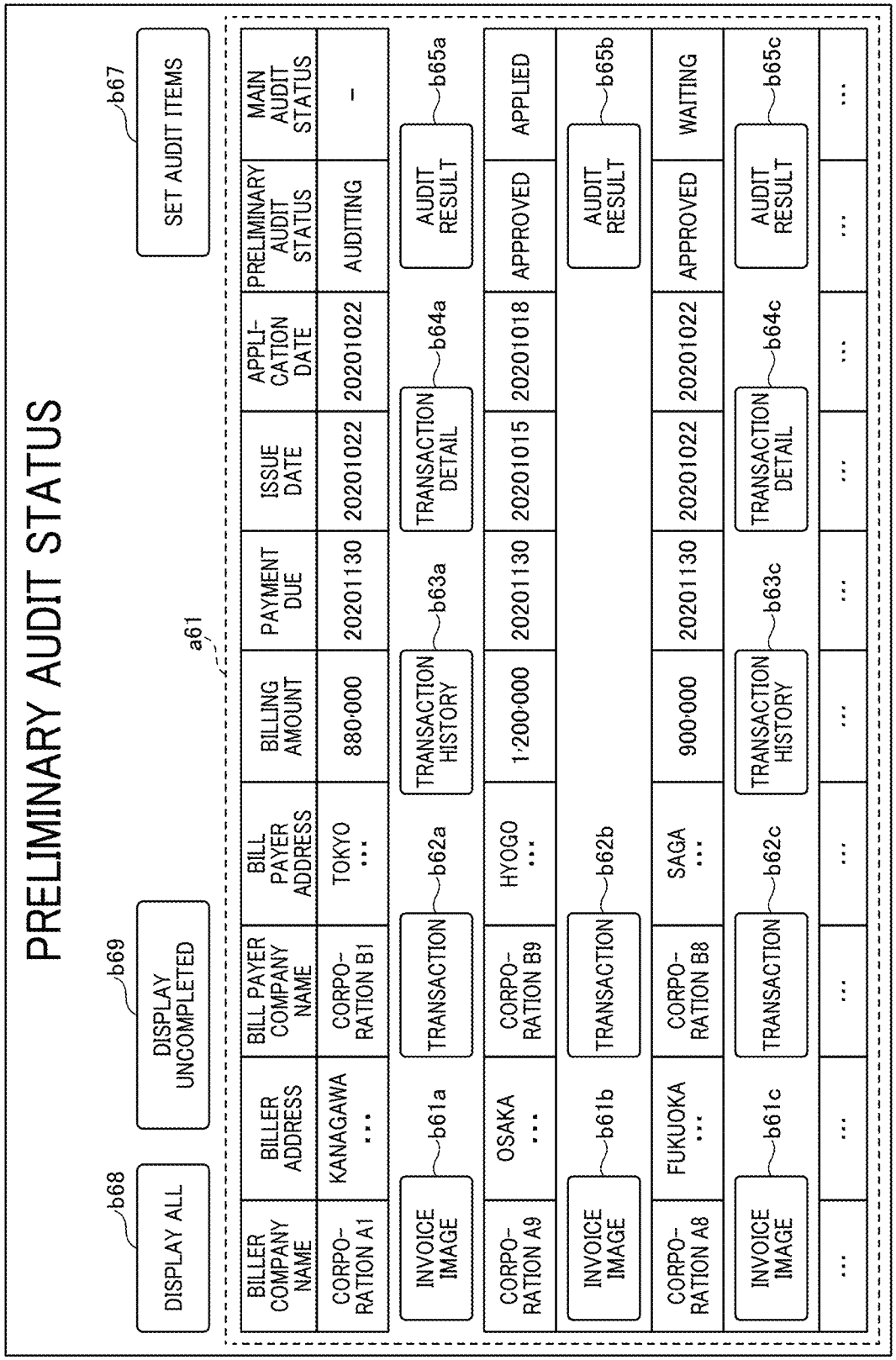
FIG. 31 is an illustration of an example of preliminary audit list screen.

Subsequently, at the intermediary server 3, the storing and reading processing unit 39 reads audit information registered in the audit management DB 3003 and application information registered in the application information management DB 3004. The generation unit 36 generates data of preliminary audit list screen as illustrated in FIG. 31 based on the audit information and the application information that are read (S123). Then, the transmission and reception unit 31 transmits the generated screen data to the auditor terminal 5 (S124). The display control unit 54 of the auditor terminal 5 displays a preliminary audit list screen on the display 106 based on the transmitted screen data (S125).

FIG. 31 is a diagram illustrating an example of a preliminary audit list screen displayed on the auditor terminal 5. As illustrated in FIG. 31, the preliminary audit list screen includes a display area a61 for displaying a list of application information, a display button b67 for displaying an audit item setting screen, a display button b68 for displaying all application information, and a display button b69 for displaying only application information under preliminary audit. Each application information displayed in the display area a61 includes a check button b61 for checking an invoice image, a display button b62 for displaying a transaction information screen, a display button b63 for displaying a transaction history information screen, a display button b64 for displaying a transaction detail screen, and a display button b65 for displaying a preliminary audit result screen.

Returning to FIG. 28, description continues. At the auditor terminal 5, the acceptance unit 52 receives an operation for instructing acquisition of an invoice image (S126). Specifically, the acceptance unit 52 receives an operation of clicking the check button b61 on the preliminary audit list screen. Then, the transmission and reception unit 51 transmits a request for invoice image and an invoice number to the form management server 2 (S127). The invoice number here is the invoice number associated with the selected check button b61.

Next, at the form management server 2, the storing and reading processing unit 29 searches the invoice information management DB 2003 using the transmitted invoice number as a search key, to obtain a storage destination of the invoice image corresponding to the invoice number, and reads the invoice image from the obtained storage destination (S128). The transmission and reception unit 21 transmits the invoice image that is read to the auditor terminal 5 (S129).

Subsequently, the display control unit 54 of the auditor terminal 5 displays an invoice check screen including the transmitted invoice image (S130). FIG. 19 illustrates an example of the invoice check screen displayed on the auditor terminal 5. When the auditor checks the invoice image g51 and clicks an OK button b51, the invoice check screen is closed, and the screen is switched back to the preliminary audit list screen.

Next, at the auditor terminal 5, the acceptance unit 52 receives an operation for requesting display of the transaction information screen from the auditor (S131). Specifically, the acceptance unit 52 receives an operation of clicking the display button b62 on the preliminary audit list screen. Then, the transmission and reception unit 51 transmits a request for the transaction information screen and the tenant ID to the intermediary server 3 (S132). Accordingly, the transmission and reception unit 31 of the intermediary server 3 receives the request for transaction information screen and the tenant ID.

Subsequently, at the intermediary server 3, the storing and reading processing unit 39 reads out transaction information corresponding to the transmitted tenant ID from the financing service management DB 3005. The generation unit 36 generates data of transaction information screen as illustrated in FIG. 32 based on transaction information that is read (S133). Then, the transmission and reception unit 31 transmits the generated screen data to the auditor terminal 5 (S134). The display control unit 54 of the auditor terminal 5 displays a transaction information screen on the display 106 based on the transmitted screen data (S135).

FIG. 32 is a diagram illustrating an example of a transaction information screen displayed on the auditor terminal 5. As illustrated in FIG. 32, the transaction information screen includes a plurality of transaction list tabs t71 and t72 for displaying a list of transactions for each bank account, a check button b76 for checking an image of passbook, a print button b77, and an OK button b78. The transaction list tab is displayed for each of bank accounts registered in the tenant information management DB 2001.

In response to the acceptance unit 52 receiving an operation of clicking the check button b76, the transmission and reception unit 51 transmits a request for a transaction information image and the invoice number to the intermediary server 3. At the intermediary server 3, the storing and reading processing unit 39 searches the application information management DB 3004 using the transmitted invoice number as a search key, to specify a storage destination of the transaction information image corresponding to the invoice number, and reads the transaction information image from the specified storage destination. The transmission and reception unit 31 transmits the transaction information image that is read to the auditor terminal 5. At the auditor terminal 5, the display control unit 54 displays the transaction information image that is received.

In response to the acceptance unit 52 receiving an operation of clicking the print button b77, the transmission and reception unit 51 transmits an image representing the content of the transaction list tab to a printer, and causes the printer to print out the transaction information. In response to the acceptance unit 52 receiving an operation of clicking the OK button b78, the transaction information screen is closed, and the screen is switched back to the preliminary audit list screen.

Returning to FIG. 29, description continues. At the auditor terminal 5, the acceptance unit 52 receives an operation for requesting display of the transaction history screen from the auditor (S136). Specifically, the acceptance unit 52 receives an operation of clicking the display button b63 of the preliminary audit list screen. Then, the transmission and reception unit 51 transmits the request for the transaction history information screen, the bill payer ID, and the tenant ID to the intermediary server 3 (S137). At the intermediary server 3, the transmission and reception unit 31 transmits a request for transaction history information, the bill payer ID, and the tenant ID to the form management server 2 (S138).

Subsequently, at the form management server 2, the storing and reading processing unit 29 searches the invoice information management table corresponding to the tenant ID, using the transmitted bill payer ID as a search key to read the invoice information related to the bill payer ID (S139). In the following, the invoice information related to a specific tenant ID and a bill payer ID may be referred to as "transaction history information". The transmission and reception unit 21 transmits the read transaction history information to the intermediary server 3 (S140).

Next, at the intermediary server 3, the generation unit 36 generates data of a transaction history information screen as illustrated in FIG. 33 based on the transmitted transaction history information (S141). Then, the transmission and reception unit 31 transmits the generated screen data to the auditor terminal 5 (S142). The display control unit 54 of the auditor terminal 5 displays a transaction history screen on the display 106 based on the transmitted screen data (S143).

FIG. 33 is an illustration of an example transaction history screen displayed on the auditor terminal 5. As illustrated in FIG. 33, the transaction history screen includes a display area a81 for displaying a list of transaction history information, a print button b87, and an OK button b88.

In response to the acceptance unit 52 receiving an operation of clicking the print button b87, the transmission and reception unit 51 transmits an image representing the content of the transaction history information list to a printer, and causes the printer to print out the transaction history. In response to the acceptance unit 52 receiving an operation of clicking the OK button b78, the transaction history screen is closed, and the screen is switched back to the preliminary audit list screen.

Returning to FIG. 29, description continues. At the auditor terminal 5, the acceptance unit 52 receives an operation for requesting display of the transaction detail screen from the auditor (S144). Specifically, the acceptance unit 52 receives an operation of clicking the display button b64 of the preliminary audit list screen. Then, the transmission and reception unit 51 transmits the request for the transaction detail screen, the bill payer ID, and the tenant ID to the intermediary server 3 (S145). Thus, the transmission and reception unit 31 of the intermediary server 3 receives the request for the transaction detail screen.

Next, at the intermediary server 3, the generation unit 36 generates a transaction detail screen as illustrated in FIG. 34 in response to the request for the transaction detail screen (S146). Then, the transmission and reception unit 31 transmits the generated screen data to the auditor terminal 5 (S147). The display control unit 54 of the auditor terminal 5 displays a transaction detail screen on the display 106 based on the transmitted screen data (S148).

FIG. 34 is an illustration of an example transaction detail screen displayed on the auditor terminal 5. As illustrated in FIG. 34, the transaction detail screen includes a display area a91 for displaying a transaction status, a check button b96 for checking an image of master contract, a check button b97 for checking an image of financial statement, and an OK button b98.

The display area a91 includes a transaction status based on the transaction history information received from the form management server 2 at S140 for display. Examples of the transaction status include, but not limited to, a transaction start date, the number of transactions, an average transaction amount, a maximum transaction amount, and the number of delays. The transaction start date is the oldest date sent, from among the dates sent included in the transaction history information. The number of transactions is a number of transactions included in the transaction history information. The transaction amount is a sum of the amounts for payment of the transactions in the transaction history information. The number of delays is the number of transaction history information items whose payment date is later than the payment due date.

In response to the acceptance unit 52 receiving an operation of clicking the check button b96, the transmission and reception unit 51 transmits a request for a mater contract image and an invoice number to the intermediary server 3. At the intermediary server 3, the storing and reading processing unit 39 searches the application information management DB 3004 using the transmitted invoice number as a search key, to specify a storage destination of the master contract image corresponding to the invoice number, and reads the master contract image from the specified storage destination. The transmission and reception unit 31 transmits the master contract image that is read to the auditor terminal 5. At the auditor terminal 5, the display control unit 54 displays the master contract image that is received.

In response to the acceptance unit 52 receiving an operation of clicking the check button b97, the transmission and reception unit 51 transmits a request for a financial statement image and an invoice number to the intermediary server 3. At the intermediary server 3, the storing and reading processing unit 39 searches the application information management DB 3004 using the transmitted invoice number as a search key, to specify a storage destination of the financial statement image corresponding to the invoice number, and reads the financial statement image from the specified storage destination. The transmission and reception unit 31 transmits the financial statement image that is read to the auditor terminal 5. At the auditor terminal 5, the display control unit 54 displays the financial statement image that is received.

In response to the acceptance unit 52 receiving an operation of clicking the OK button b98, the transaction detail screen is closed, and the screen is switched back to the preliminary audit list screen.

Returning to FIG. 30, description continues. At the auditor terminal 5, the acceptance unit 52 receives an operation for requesting display of the preliminary audit result screen from the auditor (S149). Specifically, the acceptance unit 52 receives an operation of clicking the display button b65 of the preliminary audit list screen. Then, the transmission and reception unit 51 transmits a request for the preliminary audit result screen and the application ID to the intermediary server 3 (S150). Accordingly, the transmission and reception unit 31 of the intermediary server 3 receives the request for preliminary audit result screen and the application ID.

Next, at the intermediary server 3, the storing and reading processing unit 39 searches the application information management DB 3004 using the transmitted application ID as a search key, to read application information corresponding to the application ID. The generation unit 36 generates data of preliminary audit result screen as illustrated in FIG. 35 based on the application information that is read (S123). Then, the transmission and reception unit 31 transmits the generated screen data to the auditor terminal 5 (S152). The display control unit 54 of the auditor terminal 5 displays a preliminary audit result screen on the display 106 based on the transmitted screen data (S153).

FIG. 35 is a diagram illustrating an example of a preliminary audit result screen displayed on the auditor terminal 5. As illustrated in FIG. 35, the preliminary audit result screen includes a radio button r101 indicating approval of preliminary audit and a radio button r102 indicating rejection of preliminary audit, one of which is selectable. The preliminary audit result screen further includes a setting area a104 for setting a preliminary audit result, a registration button b108, and a cancel button b109. The setting area a104 is not displayed when the preliminary audit result screen is initially displayed. When the radio button r101 indicating approval of preliminary audit is selected, the setting area a14 is displayed.

The items of the preliminary audit result displayed in the setting area a104 include, for example, a billing amount, a service charge, various expenses, a transfer amount, a planned transfer date, and a payment due date. In this example, various expenses include a total amount of a revenue stamp fee, a transfer fee, and a business trip expense. The transfer amount is an amount obtained by subtracting the service charge and various expenses from the billing amount, and is an amount actually transferred from the financing service company to the service user company A. The payment due date is basically set to a payment due date on the invoice, but may be set to any desirable date thereafter (for example, the last business day of the next month).

The items of the preliminary audit result include one or more items automatically set by the generation unit 36 and one or more items manually entered by the auditor. For example, the automatically set items and the manually entered items are displayed differently, for example, by a type of line, a color of line, or a color of characters, so as to be distinguishable from each other by the auditor. In the display example of the preliminary audit result screen illustrated in FIG. 35, items to be manually entered (a service charge rate, various expenses, and a planned transfer date) are displayed with thick frame lines, and items to be automatically set (a service charge, a transfer amount, and a payment due date) are displayed with thin frame lines.

Returning to FIG. 30, description continues. The acceptance unit 52 receives an operation of inputting a preliminary audit result (S154). Specifically, the acceptance unit 52 receives an operation of clicking the registration button b108. When the cancel button b109 is clicked, the preliminary audit result screen is closed, and the screen returns to the provisional examination list screen of FIG. 31. Then, the transmission and reception unit 51 transmits a request for registering the preliminary audit result, the application ID, and the preliminary audit result information entered via the preliminary audit result screen to the intermediary server 3 (S155).

Next, at the intermediary server 3, the storing and reading processing unit 39 searches the audit management DB 3003 using the transmitted application ID as a search key, to specify audit information corresponding to the application ID. Further, the storing and reading processing unit 39 updates the specified audit information with the transmitted preliminary audit result information (S156). In this example, the storing and reading processing unit 39 updates a value of the preliminary audit status item to "OK" and updates a value of the main audit status item to "waiting". The storing and reading processing unit 39 updates a value of the preliminary audit result, with the value indicated by the transmitted preliminary audit result information.

Subsequently, at the intermediary server 3, the generation unit 36 generates a message indicating completion of preliminary audit for notification (S157). Such audit completion message includes a URL link used for accessing the preliminary audit result.

The transmission and reception unit 31 of the intermediary server 3 transmits a preliminary audit completion notification including the audit completion message to the user terminal 1 (S158). Specifically, the storing and reading processing unit 39 acquires an email address corresponding to the service user company A from the application information management DB 3004. The transmission and reception unit 31 generates an email including the audit completion message, and transmits the email to the acquired email address. The way to transmit the preliminary audit completion notification is not limited to email transmission. For example, the audit completion message may be transmitted to the user terminal 1 via the messenger application.

Figure 36:
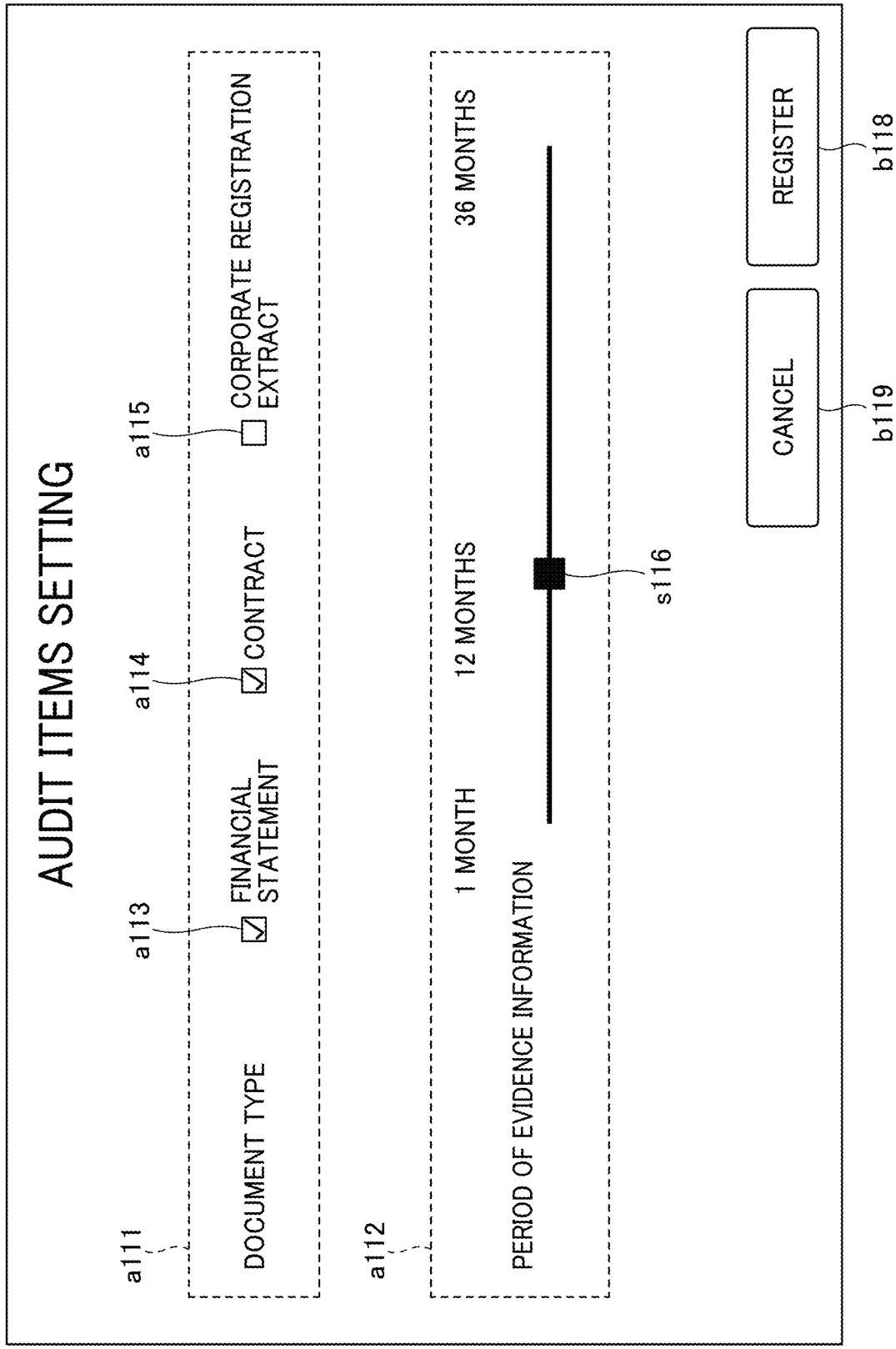
FIG. 36 is an illustration of an example audit item setting screen.

In response to the acceptance unit 52 receiving an operation of clicking the display button b67 of the preliminary audit list screen, the display control unit 54 displays an audit item setting screen as illustrated in FIG. 36 on the display 106.

FIG. 36 is a diagram illustrating an example of the audit item setting screen displayed on the auditor terminal 5. As illustrated in FIG. 36, the audit item setting screen includes an input area a111 for setting a type of document that can be used for audit, an input area a112 for setting the period for evidence information, a registration button b118, and a cancel button b119. The input area a111 includes a check box c113 for approving the financial statement as document for audit, a check box c114 for approving a master contract as document for audit, and a check box c115 for approving a corporate registration extract as document for audit. The input area a112 includes a slider bar s116 for setting the period for evidence information necessary for audit.

In response to the acceptance unit 52 receiving an operation of clicking the registration button b118, the transmission and reception unit 51 transmits information entered via the audit item setting screen to the intermediary server 3. When the cancel button b119 is clicked, the audit item setting screen is closed, and the screen returns to the preliminary audit list screen of FIG. 31. At the intermediary server 3, the storing and reading processing unit 39 updates the audit item information stored in the audit item information management DB 3002 based on the transmitted entered information.

Processing to Register Main Audit Information

Figure 37:
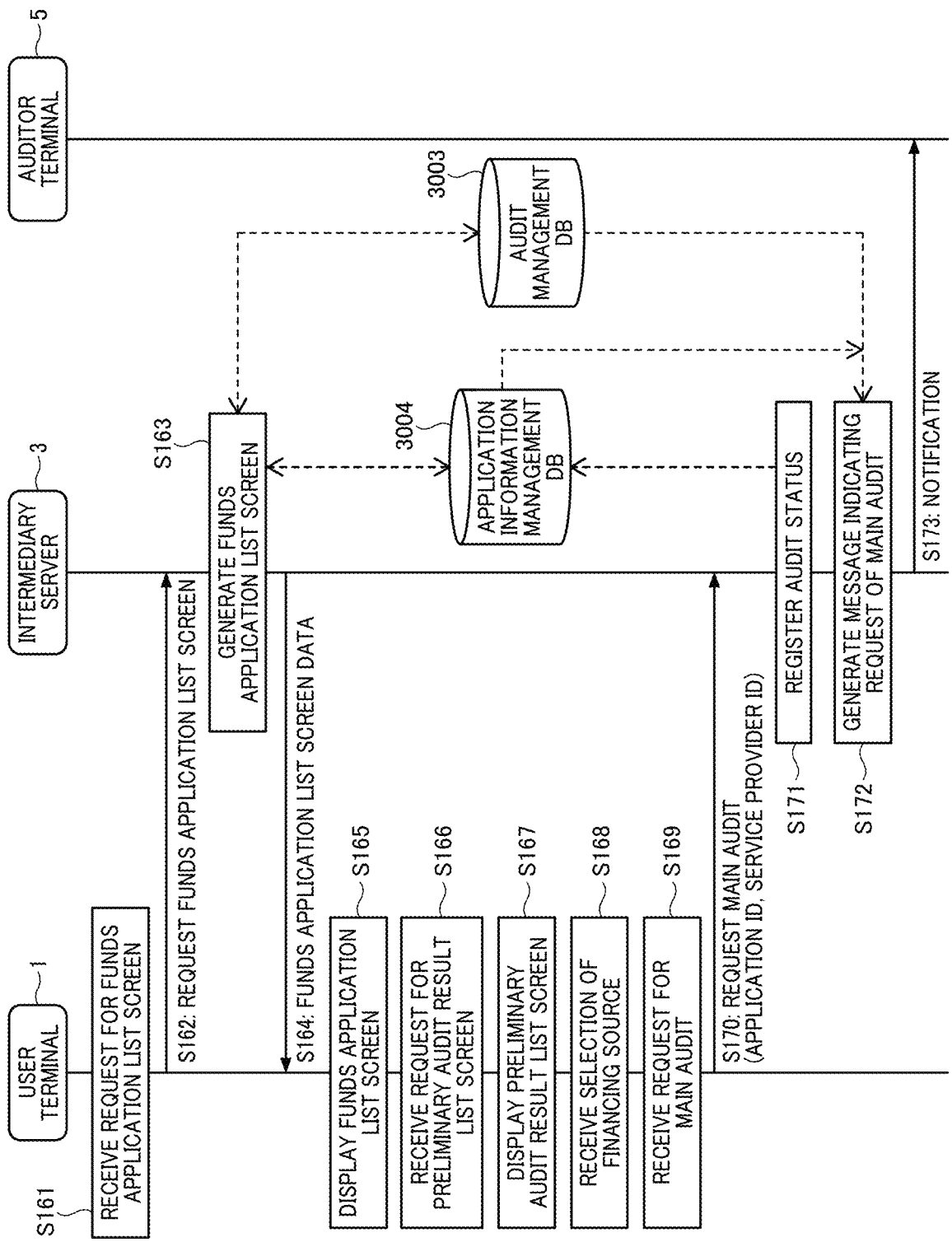
FIG. 37 is a sequence diagram illustrating processing of registering main audit information, according to the embodiment.

Referring next to FIG. 37 to FIG. 39, processing of registering main audit information is described according to the embodiment. FIG. 37 is a sequence diagram illustrating processing of registering main audit information, according to the embodiment. FIG. 38 is an illustration of an example of funds application list screen. FIG. 39 is an illustration of an example of preliminary audit result list screen.

First, at the user terminal 1, the acceptance unit 12 receives an operation of selecting a funds application list screen (S161). Specifically, the acceptance unit 12 receives an operation of clicking a URL link included in the preliminary audit completion notification transmitted to the user terminal 1. Then, the transmission and reception unit 11 transmits a request for the funds application list screen to the intermediary server 3 (S162). Thus, the transmission and reception unit 31 of the intermediary server 3 receives the request for the funding application list screen.

Subsequently, at the intermediary server 3, the storing and reading processing unit 39 reads audit information registered in the audit management DB 3003 and application information registered in the application information management DB 3004. The generation unit 36 generates data of funds application list screen as illustrated in FIG. 38 based on the audit information and the application information that are read (S163). The transmission and reception unit 31 transmits the generated screen data to the user terminal 1 (S164). The display control unit 14 of the user terminal 1 displays a funds application list screen on the display 106 based on the transmitted screen data (S165).

FIG. 38 is an illustration of an example display of funds application list screen. As illustrated in FIG. 38, the funds application list screen includes a display area a121 for displaying a list of funds application information. Each funds application information displayed in the display area a121 includes a display button b122 for displaying a preliminary audit result list screen.

Returning to FIG. 37, description continues. The acceptance unit 12 receives an operation of displaying the preliminary audit result list screen (S166). Specifically, the acceptance unit 12 receives an operation of clicking the display button b122. Then, the display control unit 14 displays a preliminary audit result list screen as illustrated in FIG. 39 on the display 106 based on the audit information and the application information read at S163 (S167).

FIG. 39 is an illustration of a display example of preliminary audit result list screen. As illustrated in FIG. 39, the preliminary audit result list screen includes a display area a131 for displaying a list of preliminary audit results, radio buttons r132a and r132b (collectively referred to as a radio button r132), and a request button b138 for requesting the main audit. The radio button 132 is displayed on a side of each financing source that has approved to finance in the preliminary audit (the preliminary audit state is "OK").

Returning to FIG. 37, description continues. The acceptance unit 12 receives an operation of selecting a financing source (S168). Specifically, the acceptance unit 12 receives an operation of selecting any one of the financing sources that have approved to finance in the preliminary audit by selecting corresponding one of the radio buttons r132a and r132b. Then, the determination unit 15 determines the financing source for which the radio button r132 has been selected as the financing source for which the main audit is requested, and determines the financing source for which the radio button r132 has not been selected as the financing source for which the main audit is not requested.

Next, the acceptance unit 12 receives an operation for requesting main audit (S169). Specifically, the acceptance unit 12 receives an operation of clicking the request button b138. Then, the transmission and reception unit 11 transmits the request for applying main audit, the application ID, and the service provider ID to the intermediary server 3 (S170). The transmission and reception unit 31 of the intermediary server 3 receives the request for applying main audit, the application ID, and the service provider ID.

Next, at the intermediary server 3, the storing and reading processing unit 39 searches the audit management DB 3003 using the transmitted application ID as a search key, to specify audit information corresponding to the service provider ID. The storing and reading processing unit 39 updates a value of the main audit status item in the audit information corresponding to the transmitted service provider ID, with "application requested". The storing and reading processing unit 39 updates a value of the main audit status item in the audit information corresponding to a service provided ID other than the transmitted service provider ID, with "application not requested" (S171).

Next, at the intermediary server 3, the storing and reading processing unit 39 searches the audit management DB 3003 and the application information management DB 3004 using the transmitted application ID as a search key, to read audit information and application information each corresponding to the application ID. The generation unit 36 generates a message indicating a result of main audit request based on the audit information and the application information that have been read (S172). The message indicating the result of main audit request includes a text indicating that the main audit is to be requested to the financing service company that is selected, and a text indicating that the main audit is not requested to the financing service company that is unselected.

The transmission and reception unit 31 of the intermediary server 3 transmits a main audit request confirmation notification including the message indicating the result of main audit request to the auditor terminal 5 (S173). Specifically, the storing and reading processing unit 39 acquires an email address corresponding to each of the financing sources for which the main audit is requested, from the financing source management DB 3001. The transmission and reception unit 31 transmits an email including the message indicating that the main audit is requested, to the auditor terminal 5 of the financing service company for which the main audit is to be requested. Further, the transmission and reception unit 31 transmits an email including a message indicating that the main audit is not requested, to the auditor terminal 5 of the financing service company for which the main audit is not to be requested. The way to transmit the main audit request confirmation notification is not limited to email transmission. For example, a message including the main audit request confirmation information may be transmitted to the auditor terminal 5 via a messenger application.

As described above, according to the present embodiment, the intermediary server 3 (intermediary system 4) transmits the form identification information of the form generated by the form management server 2 to the auditor terminal 5. This reduces work on the user in applying for financing, as various information that is managed using the form identification information can be transmitted to the auditor terminal 5.

In the above-described embodiment, the main audit is performed after the preliminary audit. However, all processes related to the preliminary audit such as a request for preliminary audit may be performed as processes for the main audit, while omitting the processes related to the main audit.

The user terminal 1 is an example of a communication terminal. Examples of the user terminal 1 include, in addition to the PC, a smart watch, a game machine, and a video conference system.

Some hardware elements, such as the CPU 101, may be single or plural.

Each of the functions of the above-described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), System on a chip (SOC), graphical processing unit (GPU), and conventional circuit components arranged to perform the recited functions.

The servers 2 and 3 described in the embodiment are merely one example of plural computing environments that implement one or more embodiments disclosed herein. For example, any one of the form management server 2 and the intermediary server 3 may include a plurality of computing devices such as a server cluster. The plurality of computing devices are configured to communicate with one another through any type of communication link, including a communication network, a shared memory, etc., and perform processes disclosed herein. In substantially the same manner, any one of the form management server 2 and the intermediary server 3 can include a plurality of computing devices configured to communicate with one another.

Further, the intermediary server 3 (or the form management server 2) can be configured to share the disclosed processes with any server in various combinations. For example, a part of processes to be executed by the intermediary server 3 (or the form management server 2) can be executed by any other server. Similarly, a part of functions to be executed by the intermediary server 3 (or the form management server 2) can be performed by any other server. Further, the elements of the intermediary server 3 (or the form management server 2) and any other server may be combined into one apparatus or may be divided into a plurality of apparatuses.

Furthermore, in communication between each terminal and each server (such as communication between any one of the user terminal 1, the form management server 2, the intermediary server 3, and the auditor terminal 5), any intermediary device such as another server or a router may be disposed to relay data.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

In one aspect, an intermediary server communicates with a form management server that generates a form indicating a transaction between a user and a customer of the user and transmits the form to the customer, in response to a request from the user. The intermediary server includes circuitry that receives a request for applying audit for financing based on the form, and a form identifier of the form, which is transmitted from the form management server based on a request for applying audit based on the form from the user terminal of the user. The circuitry of the intermediary server transmits a request for applying audit for financing and the form identifier of the form to an auditor terminal operated by an auditor.

In another aspect, the intermediary server transmits data of an audit registration screen for allowing the user to register information used for audit for financing, receives information input by the user via the registration screen from the user terminal, and stores, in a memory, the input information and the form identifier of the form in association.

In another aspect, the circuitry of the server transmits data of a result registration screen for allowing the auditor to register a result of audit that is requested, to the auditor terminal, receives information on the result of audit from the auditor terminal, and stores the result of audit in association with the form identifier of the form in association.

In another aspect, the circuitry of the server transmits data of a result display screen for displaying information on the audit having the audit result registered, to the user terminal. The circuitry further receives a request for applying additional audit for financing, entered via the result registration screen, from the user terminal, and stores the request for applying additional audit in association with the form identifier of the form.

In another aspect, the circuitry of the server receives first audit information indicating past transactions between the user and the customer, based on the request for applying audit for financing based on the invoice, from the another server, and stores the first audit information in association with the form identifier of the form.

In another aspect, the circuitry of the server receives second audit information indicating transaction information of an account in relation to the user, based on the request for applying audit for financing based on the form, from the another server, and stores the second audit information in association with the form identifier of the form.

In another aspect, an intermediary system is provided, which generates a form indicating a transaction between a user and a customer of the user and transmits the form to the customer, in response to a request from the user. The intermediary system includes circuitry that receives a request for applying audit for financing based on the form, and a form identifier of the form, which is transmitted from the user terminal of the user. The circuitry further transmits a request for applying audit for financing ad the form identifier of the form to an auditor terminal operated by an auditor.

In another aspect, a method for intermediating communication between a form management server and the terminal is provided. The form management server generates a form indicating a transaction between a user and a customer of the user and transmits the form to the customer, in response to a request from the user.

The invention claimed is:

1. A server system comprising:
a memory that stores information relating to a plurality of forms each issued by a first user in relation to transactions between the first user and a second user; and
circuitry configured to:
receive, from a first terminal of the first user, an identifier identifying the first user, and a request for applying an audit for financing based on particular forms of the plurality of forms, the particular forms being selected from among the plurality of forms by the first user;
in response to receiving the request for applying an audit for financing, determine financing source information including a business type of the first user using the identifier of the first user;
generate screen data that lists one or more financing sources that the request for applying the audit can be requested, corresponding to the financing source information; and
determine a second terminal, as a financing source selected from the screen data by the first terminal;
determine a period for evidence information for the audit, which corresponds to the financing source that has been determined;
transmit a request for audit information, the request including a biller identification, a bill payer identification, and the period for the evidence information;
determine the audit information based on the biller identification, the bill payer identification, and the period for the evidence information, the audit information including an identifier of forms issued by the first user;
transmit, to the first terminal, the audit information which has been determined, the audit information including the identifier of the forms issued by the first user;
transmit a request for applying the audit for financing and the identifiers of the forms issued by the first user which are identifiers of the particular forms of the plurality of forms issued by the first user to a second terminal; and
transmit the particular forms of the plurality of forms issued by the first user corresponding to the received identifiers to the second terminal, in response to receiving the identifier of the particular forms from the second terminal.

2. The server system of claim 1, wherein:
the circuitry receives the request for applying an audit, via a user interface that allows the first user to request transmission of the particular forms to a destination, the user interface including the identifiers of the particular forms.

3. The server system of claim 1, wherein:
the circuitry generates the particular forms issued by the first user, in response to a request from the first terminal.

4. The server system of claim 1, wherein;
the circuitry is configured to select, from among a plurality of auditors, one or more of auditors capable of providing the audit to the first user, based on the information relating to the particular forms,
the second terminal being a terminal of the one or more of auditors having been selected.

5. The server system of claim 1, wherein:
the circuitry is configured to transmit, to the first terminal, a user interface that allows the first user to input information to be used for the audit,
receive the information input by the first user via the user interface from the first terminal, and
store, in the memory, the information input by the first user in association with the identifier of the particular forms.

6. The server system of claim 5, wherein;
the circuitry is configured to transmit, to the second terminal, a user interface that allows an auditor of the second terminal to input information on a result of the audit that is requested,
receive the information on a result of the audit from the second terminal, and
store, in the memory, the information on a result of the audit in association with the identifier of the particular forms.

7. The server system of claim 6, wherein:
the circuitry transmits a user interface that displays the information on a result of the audit having been stored, to the second terminal,
receive a request for applying an additional audit for financing from the first terminal, and
store the request for applying the additional audit in association with the form identifier of the forms.

8. The server system of claim 1, wherein the circuitry is further configured to:
receive, from the first terminal of the first user, a request for a particular form; and
obtain the particular form and the identifier of the particular form, in response to the request.

9. The server system of claim 1, further comprising:
a form management server; and
an intermediate server,
wherein:
the form management server includes:
the memory;
circuitry configured to generate a plurality of forms issued by the first user in relation to transactions between the first user and the second user, in response to a request for the form from a first terminal of the first user; and
circuitry configured to transmit, to the intermediary server, the request for applying the audit for financing based on the particular form and an identifier of the particular form, in response to a request for applying the audit for financing based on the particular of the plurality of forms, from the first terminal;
wherein the intermediate server includes:
circuitry configured to transmit, to the second terminal, a request for applying an audit for financing and at least the identifier of the particular form,
wherein the form management server further includes circuitry configured to transmit information on the particular form identified with the identifier to the second terminal.

10. The server system of claim 1, wherein:
the period for evidence information is a longest period from among a plurality of periods for evidence information that have been read.

11. A communication system comprising:
the server system of claim 1; and
the first terminal configured to transmit a request for applying the audit for financing based on the particular forms, to the server system.

12. A server comprising:
a network interface configured to communicate with another server that generates a plurality of forms each issued by a first user of a first terminal in relation to transactions between the first user and a second user; and
circuitry configured to:
receive, from the another server, an identifier identifying the first user, and a request for applying an audit for financing based on particular forms of the plurality of forms, the particular forms being selected from among the plurality of forms by the first user;
in response to receiving the request for applying an audit for financing, determine financing source information including a business type of the first user using the identifier of the first user;
generate screen data that lists one or more financing sources that the request for applying an audit can be requested, corresponding to the financing source information; and
determine a second terminal, as a financing source selected from the screen data by the first terminal;
determine a period for evidence information for the audit, which corresponds to the financing source that has been determined;
transmit a request for audit information, the request including a biller identification a bill payer identification, and the period for the evidence information;
determine the audit information based on the biller identification, the bill payer identification, and the period for the evidence information, the audit information including an identifier of forms issued by the first user;
transmit, to the first terminal, the audit information which has been determined, the audit information including the identifier of the forms issued by the first user;
transmit a request for applying the audit for financing and the identifiers of the forms issued by the first user which are identifiers of the particular forms of the plurality of forms issued by the first user to the second terminal; and
in response to receiving the identifiers of the particular forms issued by the first user from the second terminal, transmit the particular forms of the plurality of forms corresponding to the received identifiers to the second terminal.

13. The server of claim 12, wherein:
the circuitry receives first audit information indicating past transactions between the first user and the second user, based on the request for applying the audit for financing based on the particular forms, from the another server, and stores the first audit information in association with the form identifier of the particular forms.

14. The server of claim 13, wherein:
the circuitry receives second audit information indicating transaction information of an account in relation to the first user, based on the request for applying the audit for financing based on the particular forms, from the another server apparatus, and stores the second audit information in association with the form identifier of the particular forms.

15. The server system of claim 12, further comprising:
circuitry configured to transmit, to the second terminal, a request for applying an audit for financing and at least the identifier of the particular forms.

16. A method of intermediating communication, comprising:
storing in a memory information relating to a plurality of forms each issued by a first user in relation to transactions between the first user and a second user;
receiving, from a first terminal of the first user, an identifier identifying the first user, and a request for applying an audit for financing based on particular forms of the plurality of forms, the particular forms being selected from among the plurality of forms by the first user;
in response to receiving the request for applying an audit for financing, determine financing source information including a business type of the first user using the identifier of the first user;
generate screen data that lists one or more financing sources that the request for applying an audit can be requested, corresponding to the financing source information; and
determine a second terminal, as a financing source selected from the screen data by the first terminal;
determining a period for evidence information for the audit, which corresponds to the financing source that has been determined;
transmitting a request for audit information, the request including a biller identification a bill payer identification, and the period for the evidence information;
determining the audit information based on the biller identification, the bill payer identification, and the period for the evidence information, the audit information including an identifier of forms issued by the first user;
transmitting, to the first terminal, the audit information which has been determined, the audit information including the identifier of the forms issued by the first user;
transmitting a request for applying the audit for financing and the identifiers of the particular forms of the plurality of forms issued by the first user to the second terminal; and
transmitting, in response to receiving the identifier of the particular forms from the second terminal, the particular forms of the plurality of forms issued by the first user corresponding to the received identifiers to the second terminal.

17. The method of claim 16, further comprising:
obtaining, from the memory, information relating to the particular forms using the identifier of the particular forms; and
transmitting the information relating to the particular forms to the second terminal.

18. The method of claim 17, further comprising:
selecting, from among a plurality of service providers, one or more service providers capable of providing the audit for financing to the first user, based on the information relating to the particular forms,
the second terminal being a terminal of the one or more service providers having been selected.

19. The method according to claim 16, further comprising:
   receiving, from a first terminal of the first user, a request for a particular form; and
   obtaining the particular form and the identifier of the particular form, in response to the request.

20. The method according to claim 16, further comprising:
   generating, by a form management server which includes the memory, a plurality of forms issued by the first user in relation to transactions between the first user and the second user, in response to a request for the form from a first terminal of the first user; and
   transmitting, by a form management server to an intermediary server, the request for applying the audit for financing based on the particular form and an identifier of the particular form, in response to a request for applying the audit for financing based on the particular of the plurality of forms, from the first terminal;
   transmitting, by the form management server to the second terminal, a request for applying an audit for financing and at least the identifier of the particular form; and
   transmitting, by the form management server, information on the particular form identified with the identifier to the second terminal.

* * * * *